US009922579B2

(12) United States Patent
Black et al.

(10) Patent No.: US 9,922,579 B2
(45) Date of Patent: Mar. 20, 2018

(54) GALLBLADDER MODEL

(71) Applicant: Applied Medical Resources Corporation, Rancho Santa Margarita, CA (US)

(72) Inventors: Katie Black, Rancho Santa Margarita, CA (US); Tracy Breslin, Rancho Santa Margarita, CA (US); Nikolai Poulsen, Rancho Santa Margarita, CA (US); Charles C. Hart, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 220 days.

(21) Appl. No.: 14/308,385

(22) Filed: Jun. 18, 2014

(65) Prior Publication Data

US 2014/0370477 A1 Dec. 18, 2014

Related U.S. Application Data

(60) Provisional application No. 61/836,512, filed on Jun. 18, 2013.

(51) Int. Cl.
*G09B 23/30* (2006.01)
*G09B 23/32* (2006.01)
*G09B 23/34* (2006.01)

(52) U.S. Cl.
CPC .............. *G09B 23/34* (2013.01); *G09B 23/30* (2013.01); *G09B 23/32* (2013.01)

(58) Field of Classification Search
CPC ......... G09B 23/28; G09B 23/30; G09B 23/34
(Continued)

(56) References Cited

U.S. PATENT DOCUMENTS

| 184,573 A | 11/1876 | Becker |
| 2,127,774 A | 8/1938 | Jacobson |

(Continued)

FOREIGN PATENT DOCUMENTS

| CN | 2421706 Y | 2/2001 |
| CN | 2751372 Y | 1/2006 |

(Continued)

OTHER PUBLICATIONS

European Patent Office, The International Search Report and Written Opinion of the International Searching Authority for International Application No. PCT/US2014/038195 titled "Hernia Model", dated Oct. 15, 2014.

(Continued)

*Primary Examiner* — Thomas Hong
*Assistant Examiner* — Jennifer L Korb
(74) *Attorney, Agent, or Firm* — Rimas T. Lukas

(57) ABSTRACT

An anatomical model for surgical training is provided. The model includes a first layer simulating a liver and a second layer including a simulated gallbladder. A third layer having an inner surface and an outer surface is provided between the first and second layer. The outer surface of the third layer is adhered to the first layer at location around the simulated gallbladder and the simulated gallbladder is adhered to the inner surface of the third layer. A fourth layer is provided that overlays both the second layer and the simulated gallbladder. A frame is embedded within the first layer and is connectable to a support. The model provides a substantially upright projection of a simulated gallbladder and liver in a retracted orientation ideally suited for practicing laparoscopic cholecystectomy when inserted inside a simulated insufflated cavity of laparoscopic trainer.

25 Claims, 4 Drawing Sheets

(58) Field of Classification Search
USPC ........................................................ 434/272
See application file for complete search history.

(56) References Cited

U.S. PATENT DOCUMENTS

| | | | |
|---|---|---|---|
| 2,284,888 A | 6/1942 | Arnell, Jr. | |
| 2,324,702 A | 7/1943 | Hoffman et al. | |
| 2,345,489 A | 3/1944 | Lord | |
| 2,495,568 A | 1/1950 | Coel | |
| 3,766,666 A | 10/1973 | Stroop | |
| 3,775,865 A | 12/1973 | Rowan | |
| 3,789,518 A | 2/1974 | Chase | |
| 3,921,311 A | 11/1975 | Beasley et al. | |
| 3,991,490 A | 11/1976 | Markman | |
| 4,001,951 A | 1/1977 | Fasse | |
| 4,001,952 A | 1/1977 | Kleppinger | |
| 4,321,047 A | 3/1982 | Landis | |
| 4,323,350 A | 4/1982 | Bowden, Jr. | |
| 4,332,569 A | 6/1982 | Burbank | |
| 4,371,345 A | 2/1983 | Palmer et al. | |
| 4,386,917 A | 6/1983 | Forrest | |
| 4,459,113 A | 7/1984 | Boscaro Gatti et al. | |
| 4,481,001 A * | 11/1984 | Graham | G09B 23/285 434/267 |
| 4,596,528 A | 6/1986 | Lewis et al. | |
| 4,726,772 A | 2/1988 | Amplatz | |
| 4,737,109 A | 4/1988 | Abramson | |
| 4,789,340 A | 12/1988 | Zikria | |
| 4,832,978 A | 5/1989 | Lesser | |
| 4,867,686 A | 9/1989 | Goldstein | |
| 4,907,973 A | 3/1990 | Hon | |
| 4,938,696 A | 7/1990 | Foster et al. | |
| 4,940,412 A | 7/1990 | Blumenthal | |
| 5,061,187 A | 10/1991 | Jerath | |
| 5,083,962 A | 1/1992 | Pracas | |
| 5,104,328 A | 4/1992 | Lounsbury | |
| 5,149,270 A | 9/1992 | McKeown | |
| 5,180,308 A | 1/1993 | Garito et al. | |
| 5,230,630 A | 7/1993 | Burgett | |
| 5,273,435 A | 12/1993 | Jacobson | |
| 5,295,694 A | 3/1994 | Levin | |
| 5,310,348 A | 5/1994 | Miller | |
| 5,318,448 A | 6/1994 | Garito et al. | |
| 5,320,537 A | 6/1994 | Watson | |
| 5,358,408 A | 10/1994 | Medina | |
| 5,368,487 A | 11/1994 | Medina | |
| 5,380,207 A | 1/1995 | Siepser | |
| 5,403,191 A | 4/1995 | Tuason | |
| 5,425,644 A | 6/1995 | Szinicz | |
| 5,425,731 A | 6/1995 | Daniel et al. | |
| 5,472,345 A | 12/1995 | Eggert | |
| 5,518,406 A | 5/1996 | Waters | |
| 5,518,407 A | 5/1996 | Greenfield et al. | |
| 5,520,633 A | 5/1996 | Costin | |
| 5,541,304 A | 7/1996 | Thompson | |
| 5,620,326 A | 4/1997 | Younker | |
| 5,720,742 A | 2/1998 | Zacharias | |
| 5,722,836 A | 3/1998 | Younker | |
| 5,727,948 A | 3/1998 | Jordan | |
| 5,743,730 A | 4/1998 | Clester et al. | |
| 5,762,458 A | 6/1998 | Wang et al. | |
| 5,769,640 A | 6/1998 | Jacobus et al. | |
| 5,775,916 A | 7/1998 | Cooper et al. | |
| 5,785,531 A | 7/1998 | Leung | |
| 5,800,178 A | 9/1998 | Gillio | |
| 5,803,746 A | 9/1998 | Barrie et al. | |
| 5,807,378 A | 9/1998 | Jensen et al. | |
| 5,810,880 A | 9/1998 | Jensen et al. | |
| 5,814,038 A | 9/1998 | Jensen et al. | |
| 5,850,033 A | 12/1998 | Mirzeabasov et al. | |
| 5,855,583 A | 1/1999 | Wang et al. | |
| 5,873,732 A | 2/1999 | Hasson | |
| 5,873,863 A | 2/1999 | Komlosi | |
| 5,908,302 A | 6/1999 | Goldfarb | |
| 5,947,743 A | 9/1999 | Hasson | |
| 5,951,301 A * | 9/1999 | Younker | G09B 23/28 434/268 |
| 6,080,181 A | 6/2000 | Jensen et al. | |
| 6,083,008 A | 7/2000 | Yamada et al. | |
| 6,113,395 A | 9/2000 | Hon | |
| 6,234,804 B1 | 5/2001 | Yong | |
| 6,336,812 B1 * | 1/2002 | Cooper | G09B 23/286 434/262 |
| 6,398,557 B1 | 6/2002 | Hoballah | |
| 6,413,264 B1 | 7/2002 | Jensen et al. | |
| 6,474,993 B1 | 11/2002 | Grund et al. | |
| 6,485,308 B1 | 11/2002 | Goldstein | |
| 6,488,507 B1 | 12/2002 | Stoloff et al. | |
| 6,497,902 B1 | 12/2002 | Ma | |
| 6,511,325 B1 | 1/2003 | Lalka et al. | |
| 6,517,354 B1 | 2/2003 | Levy | |
| 6,568,941 B1 | 5/2003 | Goldstein | |
| 6,620,174 B2 | 9/2003 | Jensen et al. | |
| 6,654,000 B2 | 11/2003 | Rosenberg | |
| 6,659,776 B1 | 12/2003 | Aumann et al. | |
| 6,773,263 B2 | 8/2004 | Nicholls et al. | |
| 6,780,016 B1 | 8/2004 | Toly | |
| 6,817,973 B2 | 11/2004 | Merril et al. | |
| 6,820,025 B2 | 11/2004 | Bachmann et al. | |
| 6,854,976 B1 | 2/2005 | Suhr | |
| 6,857,878 B1 | 2/2005 | Chosack et al. | |
| 6,863,536 B1 | 3/2005 | Fisher et al. | |
| 6,866,514 B2 | 3/2005 | Von Roeschlaub et al. | |
| 6,887,082 B2 | 5/2005 | Shun | |
| 6,929,481 B1 | 8/2005 | Alexander et al. | |
| 6,939,138 B2 | 9/2005 | Chosack et al. | |
| 6,950,025 B1 | 9/2005 | Nguyen | |
| 6,960,617 B2 | 11/2005 | Omidian et al. | |
| 6,997,719 B2 | 2/2006 | Wellman et al. | |
| 7,008,232 B2 | 3/2006 | Brassel | |
| 7,018,327 B1 | 3/2006 | Conti | |
| 7,025,064 B2 | 4/2006 | Wang et al. | |
| 7,056,123 B2 | 6/2006 | Gregorio et al. | |
| 7,080,984 B1 | 7/2006 | Cohen | |
| 7,118,582 B1 | 10/2006 | Wang et al. | |
| 7,255,565 B2 | 8/2007 | Keegan | |
| 7,269,532 B2 | 9/2007 | David et al. | |
| 7,272,766 B2 | 9/2007 | Sakezles | |
| 7,300,450 B2 | 11/2007 | Vleugels et al. | |
| 7,364,582 B2 | 4/2008 | Lee | |
| 7,404,716 B2 | 7/2008 | Gregorio et al. | |
| 7,419,376 B2 | 9/2008 | Sarvazyan et al. | |
| 7,427,199 B2 | 9/2008 | Sakezles | |
| 7,431,189 B2 | 10/2008 | Shelton, IV et al. | |
| 7,441,684 B2 | 10/2008 | Shelton, IV et al. | |
| 7,465,168 B2 | 12/2008 | Allen et al. | |
| 7,467,075 B2 | 12/2008 | Humphries et al. | |
| 7,544,062 B1 | 6/2009 | Hauschild et al. | |
| 7,549,866 B2 | 6/2009 | Cohen et al. | |
| 7,553,159 B1 | 6/2009 | Arnal et al. | |
| 7,575,434 B2 | 8/2009 | Palakodeti | |
| 7,594,815 B2 | 9/2009 | Toly | |
| 7,621,749 B2 | 11/2009 | Munday | |
| 7,646,901 B2 | 1/2010 | Murphy et al. | |
| 7,648,367 B1 | 1/2010 | Makower et al. | |
| 7,648,513 B2 | 1/2010 | Green et al. | |
| 7,651,332 B2 | 1/2010 | Dupuis et al. | |
| 7,677,897 B2 | 3/2010 | Sakezles | |
| 7,775,916 B1 | 8/2010 | Mahoney | |
| 7,780,451 B2 | 8/2010 | Willobee et al. | |
| 7,802,990 B2 | 9/2010 | Korndorffer et al. | |
| 7,803,151 B2 | 9/2010 | Whitman | |
| 7,806,696 B2 | 10/2010 | Alexander et al. | |
| 7,819,799 B2 | 10/2010 | Merril et al. | |
| 7,833,018 B2 | 11/2010 | Alexander et al. | |
| 7,837,473 B2 | 11/2010 | Koh | |
| 7,850,454 B2 | 12/2010 | Toly | |
| 7,850,456 B2 | 12/2010 | Chosack et al. | |
| 7,854,612 B2 | 12/2010 | Frassica et al. | |
| 7,857,626 B2 | 12/2010 | Toly | |
| 7,866,983 B2 | 1/2011 | Hemphill et al. | |
| 7,931,470 B2 | 4/2011 | Alexander et al. | |
| 7,931,471 B2 | 4/2011 | Senagore et al. | |
| 7,988,992 B2 | 8/2011 | Omidian et al. | |

(56) References Cited

U.S. PATENT DOCUMENTS

| | | |
|---|---|---|
| 7,993,140 B2 | 8/2011 | Sakezles |
| 7,997,903 B2 | 8/2011 | Hasson et al. |
| 8,007,281 B2 | 8/2011 | Toly |
| 8,007,282 B2 | 8/2011 | Gregorio et al. |
| 8,016,818 B2 | 9/2011 | Ellis et al. |
| 8,021,162 B2 | 9/2011 | Sui |
| 8,048,088 B2 | 11/2011 | Green et al. |
| 8,083,691 B2 | 12/2011 | Goldenberg et al. |
| 8,116,847 B2 | 2/2012 | Gattani et al. |
| 8,137,110 B2 | 3/2012 | Sakezles |
| 8,157,145 B2 | 4/2012 | Shelton, IV et al. |
| 8,197,464 B2 | 6/2012 | Krever et al. |
| 8,205,779 B2 | 6/2012 | Ma et al. |
| 8,221,129 B2 | 7/2012 | Parry et al. |
| 8,297,982 B2 | 10/2012 | Park et al. |
| 8,308,817 B2 | 11/2012 | Egilsson et al. |
| 8,323,028 B2 | 12/2012 | Matanhelia |
| 8,323,029 B2 | 12/2012 | Toly |
| 8,328,560 B2 | 12/2012 | Niblock et al. |
| 8,342,851 B1 | 1/2013 | Speeg et al. |
| 8,403,674 B2 | 3/2013 | Feygin et al. |
| 8,403,675 B2 | 3/2013 | Stoianovici et al. |
| 8,403,676 B2 | 3/2013 | Frassica et al. |
| 8,408,920 B2 | 4/2013 | Speller |
| 8,425,234 B2 | 4/2013 | Sakezles |
| 8,439,687 B1 | 5/2013 | Morriss et al. |
| 8,442,621 B2 | 5/2013 | Gorek et al. |
| 8,454,368 B2 | 6/2013 | Ault et al. |
| 8,459,094 B2 | 6/2013 | Yanni |
| 8,459,520 B2 | 6/2013 | Giordano et al. |
| 8,460,002 B2 | 6/2013 | Wang et al. |
| 8,469,715 B2 | 6/2013 | Ambrozio |
| 8,469,716 B2 | 6/2013 | Fedotov et al. |
| 8,480,407 B2 | 7/2013 | Campbell et al. |
| 8,480,408 B2 | 7/2013 | Ishii et al. |
| 8,491,309 B2 | 7/2013 | Parry et al. |
| 8,500,753 B2 | 8/2013 | Green et al. |
| 8,512,044 B2 | 8/2013 | Sakezles |
| 8,517,243 B2 | 8/2013 | Giordano et al. |
| 8,521,252 B2 | 8/2013 | Diez |
| 8,535,062 B2 | 9/2013 | Nguyen |
| 8,544,711 B2 | 10/2013 | Ma et al. |
| 8,556,635 B2 | 10/2013 | Toly |
| 8,608,483 B2 | 12/2013 | Trotta et al. |
| 8,613,621 B2 | 12/2013 | Henderickson et al. |
| 8,636,520 B2 | 1/2014 | Iwasaki et al. |
| D699,297 S | 2/2014 | Bahsoun et al. |
| 8,641,423 B2 | 2/2014 | Gumkowski |
| 8,647,125 B2 | 2/2014 | Johns et al. |
| 8,678,831 B2 | 3/2014 | Trotta et al. |
| 8,679,279 B2 | 3/2014 | Thompson et al. |
| 8,696,363 B2 | 4/2014 | Gray et al. |
| 8,708,213 B2 | 4/2014 | Shelton, IV et al. |
| 8,708,707 B2 | 4/2014 | Hendrickson et al. |
| 8,764,449 B2 | 7/2014 | Rios et al. |
| 8,764,452 B2 | 7/2014 | Pravong et al. |
| 8,800,839 B2 | 8/2014 | Beetel |
| 8,801,437 B2 | 8/2014 | Mousques |
| 8,801,438 B2 | 8/2014 | Sakezles |
| 8,807,414 B2 | 8/2014 | Ross et al. |
| 8,808,004 B2 | 8/2014 | Misawa et al. |
| 8,808,311 B2 | 8/2014 | Heinrich et al. |
| 8,814,573 B2 | 8/2014 | Nguyen |
| 8,827,988 B2 | 9/2014 | Belson et al. |
| 8,840,628 B2 | 9/2014 | Green et al. |
| 8,870,576 B2 | 10/2014 | Millon et al. |
| 8,888,498 B2 | 11/2014 | Bisaillon et al. |
| 8,893,946 B2 | 11/2014 | Boudreaux et al. |
| 8,911,238 B2 | 12/2014 | Forsythe |
| 8,915,742 B2 | 12/2014 | Hendrickson et al. |
| 8,945,095 B2 | 2/2015 | Blumenkranz et al. |
| 8,961,190 B2 | 2/2015 | Hart et al. |
| 8,966,954 B2 | 3/2015 | Ni et al. |
| 8,968,003 B2 | 3/2015 | Hendrickson et al. |
| 9,008,989 B2 | 4/2015 | Wilson et al. |
| 9,017,080 B1 | 4/2015 | Placik |
| 9,026,247 B2 | 5/2015 | White |
| 9,050,201 B2 | 6/2015 | Egilsson et al. |
| 9,056,126 B2 | 6/2015 | Hersel et al. |
| 9,070,306 B2 | 6/2015 | Rappel et al. |
| 9,087,458 B2 | 7/2015 | Shim et al. |
| 9,117,377 B2 | 8/2015 | Shim et al. |
| 9,119,572 B2 | 9/2015 | Gorek et al. |
| 9,123,261 B2 | 9/2015 | Lowe |
| 9,129,054 B2 | 9/2015 | Nawana et al. |
| 9,196,176 B2 | 11/2015 | Hager et al. |
| 9,226,799 B2 | 1/2016 | Lightcap et al. |
| 9,257,055 B2 | 2/2016 | Endo et al. |
| 9,265,587 B2 | 2/2016 | Vancamberg et al. |
| 9,295,468 B2 | 3/2016 | Heinrich et al. |
| 9,351,714 B2 | 5/2016 | Ross et al. |
| 9,336,694 B2 | 6/2016 | Shim et al. |
| 9,358,682 B2 | 6/2016 | Ruiz Morales |
| 9,364,224 B2 | 6/2016 | Nicholas et al. |
| 9,364,279 B2 | 6/2016 | Houser et al. |
| 9,370,361 B2 | 6/2016 | Viola et al. |
| 9,373,270 B2 | 6/2016 | Miyazaki |
| 9,439,649 B2 | 9/2016 | Shelton, IV et al. |
| 9,439,733 B2 | 9/2016 | Ha et al. |
| 9,449,532 B2 | 9/2016 | Black et al. |
| 9,468,438 B2 | 10/2016 | Baber et al. |
| 2001/0019818 A1 | 9/2001 | Yong |
| 2002/0168619 A1 | 11/2002 | Provenza |
| 2003/0031993 A1 | 2/2003 | Pugh |
| 2003/0091967 A1 | 5/2003 | Chosack et al. |
| 2003/0176770 A1 | 9/2003 | Merril et al. |
| 2004/0005423 A1 | 1/2004 | Dalton et al. |
| 2004/0248072 A1 | 12/2004 | Gray et al. |
| 2005/0008997 A1 | 1/2005 | Herman |
| 2005/0026125 A1 | 2/2005 | Toly |
| 2005/0084833 A1 | 4/2005 | Lacey et al. |
| 2005/0131390 A1 | 6/2005 | Heinrich et al. |
| 2005/0142525 A1 | 6/2005 | Cotin et al. |
| 2005/0192595 A1 | 9/2005 | Green et al. |
| 2005/0196739 A1 | 9/2005 | Moriyama |
| 2005/0196740 A1 | 9/2005 | Moriyana |
| 2005/0214727 A1 | 9/2005 | Stoianovici et al. |
| 2006/0046235 A1 | 3/2006 | Alexander et al. |
| 2006/0252019 A1 | 11/2006 | Burkitt et al. |
| 2006/0275741 A1 | 12/2006 | Chewning et al. |
| 2007/0074584 A1 | 4/2007 | Talarico et al. |
| 2007/0077544 A1 | 4/2007 | Lemperle et al. |
| 2007/0078484 A1 | 4/2007 | Talarico et al. |
| 2007/0148626 A1 | 6/2007 | Ikeda |
| 2007/0166682 A1 | 7/2007 | Yarin et al. |
| 2007/0197895 A1 | 8/2007 | Nycz et al. |
| 2007/0225734 A1 | 9/2007 | Bell et al. |
| 2007/0275359 A1 | 11/2007 | Rotnes et al. |
| 2008/0032272 A1 | 2/2008 | Palakodeti |
| 2008/0032273 A1 | 2/2008 | Macnamara et al. |
| 2008/0052034 A1 | 2/2008 | David et al. |
| 2008/0064017 A1 | 3/2008 | Grundmeyer, III |
| 2008/0076101 A1 | 3/2008 | Hyde et al. |
| 2008/0097501 A1 | 4/2008 | Blier |
| 2008/0108869 A1 | 5/2008 | Sanders et al. |
| 2008/0187895 A1 | 8/2008 | Sakezles |
| 2008/0188948 A1 | 8/2008 | Flatt |
| 2008/0299529 A1 | 12/2008 | Schaller |
| 2009/0068627 A1 | 3/2009 | Toly |
| 2009/0142739 A1 | 6/2009 | Wang et al. |
| 2009/0142741 A1 | 6/2009 | Ault et al. |
| 2009/0143642 A1 | 6/2009 | Takahashi et al. |
| 2009/0176196 A1 | 7/2009 | Niblock et al. |
| 2009/0187079 A1 | 7/2009 | Albrecht et al. |
| 2009/0246747 A1 | 10/2009 | Buckman, Jr. |
| 2009/0298034 A1 | 12/2009 | Parry et al. |
| 2010/0047752 A1 | 2/2010 | Chan et al. |
| 2010/0094312 A1 | 4/2010 | Ruiz Morales et al. |
| 2010/0099067 A1 | 4/2010 | Agro |
| 2010/0167248 A1 | 7/2010 | Ryan |
| 2010/0167249 A1 | 7/2010 | Ryan |
| 2010/0167250 A1 | 7/2010 | Ryan et al. |
| 2010/0167253 A1 | 7/2010 | Ryan et al. |
| 2010/0167254 A1 | 7/2010 | Nguyen |

(56) References Cited

U.S. PATENT DOCUMENTS

| | | |
|---|---|---|
| 2010/0196867 A1 | 8/2010 | Geerligs et al. |
| 2010/0204713 A1 | 8/2010 | Ruiz Morales |
| 2010/0209899 A1 | 8/2010 | Number |
| 2010/0258611 A1 | 10/2010 | Smith et al. |
| 2010/0273136 A1 | 10/2010 | Kandasami et al. |
| 2010/0279263 A1 | 11/2010 | Duryea |
| 2010/0324541 A1 | 12/2010 | Whitman |
| 2011/0046637 A1 | 2/2011 | Patel et al. |
| 2011/0046659 A1 | 2/2011 | Ramstein et al. |
| 2011/0087238 A1 | 4/2011 | Wang et al. |
| 2011/0091855 A1 | 4/2011 | Miyazaki |
| 2011/0137337 A1 | 6/2011 | van den Dool et al. |
| 2011/0200976 A1 | 8/2011 | Hou et al. |
| 2011/0207104 A1 | 8/2011 | Trotta |
| 2011/0218550 A1 | 9/2011 | Ma |
| 2011/0244436 A1 | 10/2011 | Campo |
| 2011/0269109 A2 | 11/2011 | Miyazaki |
| 2011/0281251 A1 | 11/2011 | Mousques |
| 2011/0301620 A1 | 12/2011 | Di Betta et al. |
| 2012/0015337 A1 | 1/2012 | Hendrickson et al. |
| 2012/0015339 A1 | 1/2012 | Hendrickson et al. |
| 2012/0016362 A1 | 1/2012 | Heinrich et al. |
| 2012/0028231 A1 | 2/2012 | Misawa et al. |
| 2012/0045743 A1 | 2/2012 | Misawa et al. |
| 2012/0065632 A1 | 3/2012 | Shadduck |
| 2012/0082970 A1 | 4/2012 | Pravong et al. |
| 2012/0100217 A1 | 4/2012 | Green et al. |
| 2012/0115117 A1 | 5/2012 | Marshall |
| 2012/0115118 A1 | 5/2012 | Marshall |
| 2012/0116391 A1 | 5/2012 | Houser et al. |
| 2012/0148994 A1 | 6/2012 | Hori et al. |
| 2012/0164616 A1 | 6/2012 | Endo et al. |
| 2012/0165866 A1 | 6/2012 | Kaise et al. |
| 2012/0172873 A1 | 7/2012 | Artale et al. |
| 2012/0179072 A1 | 7/2012 | Kegreiss |
| 2012/0202180 A1 | 8/2012 | Stock et al. |
| 2012/0264096 A1 | 10/2012 | Taylor et al. |
| 2012/0264097 A1 | 10/2012 | Newcott et al. |
| 2012/0282583 A1 | 11/2012 | Thaler et al. |
| 2012/0282584 A1 | 11/2012 | Millon et al. |
| 2012/0283707 A1 | 11/2012 | Giordano et al. |
| 2012/0288839 A1 | 11/2012 | Crabtree |
| 2012/0308977 A1 | 12/2012 | Tortola |
| 2013/0087597 A1 | 4/2013 | Shelton, IV et al. |
| 2013/0101973 A1 | 4/2013 | Hoke et al. |
| 2013/0105552 A1 | 5/2013 | Weir et al. |
| 2013/0116668 A1 | 5/2013 | Shelton, IV et al. |
| 2013/0157240 A1 | 6/2013 | Hart et al. |
| 2013/0171288 A1 | 7/2013 | Harders |
| 2013/0177890 A1 | 7/2013 | Sakezles |
| 2013/0192741 A1 | 8/2013 | Trotta et al. |
| 2013/0218166 A1 | 8/2013 | Elmore |
| 2013/0224709 A1 | 8/2013 | Riojas et al. |
| 2013/0245681 A1 | 9/2013 | Straehnz et al. |
| 2013/0253480 A1 | 9/2013 | Kimball et al. |
| 2013/0267876 A1 | 10/2013 | Leckenby et al. |
| 2013/0282038 A1 | 10/2013 | Dannaher et al. |
| 2013/0288216 A1 | 10/2013 | Parry, Jr. et al. |
| 2013/0302771 A1 | 11/2013 | Alderete |
| 2013/0324991 A1 | 12/2013 | Clem et al. |
| 2013/0324999 A1 | 12/2013 | Price et al. |
| 2014/0011172 A1 | 1/2014 | Lowe |
| 2014/0017651 A1 | 1/2014 | Sugimoto et al. |
| 2014/0030682 A1* | 1/2014 | Thilenius ............... G09B 23/30 434/219 |
| 2014/0038151 A1 | 2/2014 | Hart |
| 2014/0051049 A1 | 2/2014 | Jarc et al. |
| 2014/0072941 A1 | 3/2014 | Hendrickson et al. |
| 2014/0087345 A1 | 3/2014 | Breslin et al. |
| 2014/0087346 A1 | 3/2014 | Breslin et al. |
| 2014/0087347 A1 | 3/2014 | Tracy et al. |
| 2014/0087348 A1 | 3/2014 | Tracy et al. |
| 2014/0088413 A1 | 3/2014 | Von Bucsh et al. |
| 2014/0093852 A1 | 4/2014 | Poulsen et al. |
| 2014/0093854 A1 | 4/2014 | Poulsen et al. |
| 2014/0099858 A1 | 4/2014 | Hernandez |
| 2014/0106328 A1 | 4/2014 | Loor |
| 2014/0107471 A1 | 4/2014 | Haider et al. |
| 2014/0156002 A1 | 6/2014 | Thompson et al. |
| 2014/0162016 A1 | 6/2014 | Matsui et al. |
| 2014/0170623 A1 | 6/2014 | Jarstad et al. |
| 2014/0186809 A1 | 7/2014 | Hendrickson et al. |
| 2014/0200561 A1 | 7/2014 | Ingmanson et al. |
| 2014/0212861 A1 | 7/2014 | Romano |
| 2014/0220527 A1 | 8/2014 | Li et al. |
| 2014/0220530 A1 | 8/2014 | Merkle et al. |
| 2014/0220532 A1 | 8/2014 | Ghez et al. |
| 2014/0242564 A1 | 8/2014 | Pravong et al. |
| 2014/0246479 A1 | 9/2014 | Baber et al. |
| 2014/0248596 A1 | 9/2014 | Hart et al. |
| 2014/0263538 A1 | 9/2014 | Leimbach et al. |
| 2014/0272878 A1 | 9/2014 | Shim et al. |
| 2014/0272879 A1 | 9/2014 | Shim et al. |
| 2014/0275795 A1 | 9/2014 | Little et al. |
| 2014/0275981 A1 | 9/2014 | Selover et al. |
| 2014/0277017 A1 | 9/2014 | Leimbach et al. |
| 2014/0303643 A1 | 10/2014 | Ha et al. |
| 2014/0303646 A1 | 10/2014 | Morgan et al. |
| 2014/0303660 A1 | 10/2014 | Boyden et al. |
| 2014/0308643 A1 | 10/2014 | Trotta et al. |
| 2014/0342334 A1 | 11/2014 | Black et al. |
| 2014/0349266 A1 | 11/2014 | Choi |
| 2014/0350530 A1 | 11/2014 | Ross et al. |
| 2014/0357977 A1 | 12/2014 | Zhou |
| 2014/0370477 A1 | 12/2014 | Black et al. |
| 2014/0371761 A1 | 12/2014 | Juanpera |
| 2014/0378995 A1 | 12/2014 | Kumar et al. |
| 2015/0031008 A1 | 1/2015 | Black et al. |
| 2015/0037773 A1 | 2/2015 | Quirarte Catano |
| 2015/0038613 A1 | 2/2015 | Sun et al. |
| 2015/0076207 A1 | 3/2015 | Boudreaux et al. |
| 2015/0086955 A1 | 3/2015 | Poniatowski et al. |
| 2015/0132732 A1 | 5/2015 | Hart et al. |
| 2015/0132733 A1 | 5/2015 | Garvik et al. |
| 2015/0135832 A1 | 5/2015 | Blumenkranz et al. |
| 2015/0148660 A1 | 5/2015 | Weiss et al. |
| 2015/0164598 A1 | 6/2015 | Blumenkranz et al. |
| 2015/0187229 A1 | 7/2015 | Wachli et al. |
| 2015/0194075 A1 | 7/2015 | Rappel et al. |
| 2015/0202299 A1 | 7/2015 | Burdick et al. |
| 2015/0209035 A1 | 7/2015 | Zemlock |
| 2015/0209059 A1 | 7/2015 | Trees et al. |
| 2015/0209573 A1 | 7/2015 | Hibner et al. |
| 2015/0228206 A1 | 8/2015 | Shim et al. |
| 2015/0262511 A1 | 9/2015 | Lin et al. |
| 2015/0265431 A1 | 9/2015 | Egilsson et al. |
| 2015/0272571 A1 | 10/2015 | Leimbach et al. |
| 2015/0272574 A1 | 10/2015 | Leimbach et al. |
| 2015/0272580 A1 | 10/2015 | Leimbach et al. |
| 2015/0272581 A1 | 10/2015 | Leimbach et al. |
| 2015/0272583 A1 | 10/2015 | Leimbach et al. |
| 2015/0272604 A1 | 10/2015 | Chowaniec et al. |
| 2015/0332609 A1 | 11/2015 | Alexander |
| 2015/0358426 A1 | 12/2015 | Kimball et al. |
| 2015/0371560 A1 | 12/2015 | Lowe |
| 2015/0374378 A1 | 12/2015 | Giordano et al. |
| 2015/0374449 A1 | 12/2015 | Chowaniec et al. |
| 2016/0000437 A1 | 1/2016 | Giordano et al. |
| 2016/0022374 A1 | 1/2016 | Haider et al. |
| 2016/0030240 A1 | 2/2016 | Gonenc et al. |
| 2016/0031091 A1 | 2/2016 | Popovic et al. |
| 2016/0066909 A1 | 3/2016 | Baber et al. |
| 2016/0070436 A1 | 3/2016 | Thomas et al. |
| 2016/0073928 A1 | 3/2016 | Soper et al. |
| 2016/0074103 A1 | 3/2016 | Sartor |
| 2016/0098933 A1 | 4/2016 | Reiley et al. |
| 2016/0104394 A1 | 4/2016 | Miyazaki |
| 2016/0117956 A1 | 4/2016 | Larsson et al. |
| 2016/0133158 A1 | 5/2016 | Sui et al. |
| 2016/0140876 A1 | 5/2016 | Jabbour et al. |
| 2016/0199059 A1 | 7/2016 | Shelton, IV et al. |
| 2016/0220150 A1 | 8/2016 | Sharonov |
| 2016/0220314 A1 | 8/2016 | Huelman et al. |
| 2016/0225288 A1 | 8/2016 | East et al. |

(56) References Cited

U.S. PATENT DOCUMENTS

| | | | |
|---|---|---|---|
| 2016/0232819 A1 | 8/2016 | Hofstetter et al. | |
| 2016/0235494 A1 | 8/2016 | Shelton, IV et al. | |
| 2016/0256187 A1 | 9/2016 | Shelton, IV et al. | |
| 2016/0256229 A1 | 9/2016 | Morgan et al. | |
| 2016/0262736 A1 | 9/2016 | Ross et al. | |
| 2016/0262745 A1 | 9/2016 | Morgan et al. | |
| 2016/0293055 A1 | 10/2016 | Hofstetter | |
| 2016/0296144 A1 | 10/2016 | Gaddam et al. | |

FOREIGN PATENT DOCUMENTS

| | | |
|---|---|---|
| CN | 2909427 Y | 6/2007 |
| CN | 101313842 A | 12/2008 |
| CN | 201364679 Y | 12/2009 |
| CN | 201955979 U | 8/2011 |
| CN | 202443680 U | 9/2012 |
| CN | 202563792 U | 11/2012 |
| CN | 202601055 U | 12/2012 |
| CN | 202694651 U | 1/2013 |
| CN | 103050040 A | 4/2013 |
| CN | 203013103 U | 6/2013 |
| CN | 203038549 U | 7/2013 |
| CN | 203397593 U | 1/2014 |
| CN | 203562128 U | 4/2014 |
| CN | 103886797 A | 6/2014 |
| DE | 41 05 892 | 8/1992 |
| DE | 44 14 832 | 11/1995 |
| DE | 19716341 C2 | 9/2000 |
| EP | 1 024 173 A1 | 8/2000 |
| FR | 2 691 826 | 12/1993 |
| FR | 2 917 876 | 12/2008 |
| FR | 2 917 876 A1 | 12/2008 |
| GB | 2488994 A | 9/2012 |
| JP | 10 211160 | 8/1998 |
| JP | 2001005378 A | 1/2001 |
| JP | 2009236963 A | 10/2009 |
| JP | 3162161 U | 8/2010 |
| JP | 2013127496 A | 6/2013 |
| MX | PA 02004422 A | 11/2003 |
| PT | 106230 | 9/2013 |
| WO | WO 94/06109 | 3/1994 |
| WO | WO 96/42076 | 2/1996 |
| WO | WO 98/58358 | 12/1998 |
| WO | WO 1999/01074 A1 | 1/1999 |
| WO | WO 2000/36577 | 6/2000 |
| WO | WO 2002/38039 A2 | 5/2002 |
| WO | WO 2002/038039 A3 | 5/2002 |
| WO | WO 2004/032095 | 4/2004 |
| WO | WO 2004/082486 A1 | 9/2004 |
| WO | WO 2005/071639 A1 | 8/2005 |
| WO | WO 2006/083963 A2 | 8/2006 |
| WO | WO 2007/068360 | 6/2007 |
| WO | WO 2008/021720 A2 | 2/2008 |
| WO | WO 2009/000939 | 12/2008 |
| WO | WO 2010/094730 | 8/2010 |
| WO | WO 2011/035410 A1 | 3/2011 |
| WO | WO 2011/046606 A1 | 4/2011 |
| WO | WO 2011/151304 A1 | 12/2011 |
| WO | WO 2012/149606 A1 | 11/2012 |
| WO | WO 2012168287 A1 | 12/2012 |
| WO | WO 2012175993 | 12/2012 |
| WO | WO 2013/048978 A1 | 4/2013 |
| WO | WO 2013/103956 A1 | 7/2013 |
| WO | WO 2014/022815 A1 | 2/2014 |
| WO | WO 2014/093669 A1 | 6/2014 |
| WO | WO 2015/148817 A1 | 10/2015 |

OTHER PUBLICATIONS

European Patent Office, The International Search Report and Written Opinion of the International Searching Authority for International Application No. PCT/US2014/048027 titled "First Entry Model", dated Oct. 17, 2014.

European Patent Office, The International Search Report and Written Opinion for International Application No. PCT/US2014/042998, title; Gallbladder Model, dated Jan. 7, 2015.

The International Bureau of WIPO, International Preliminary Report on Patentability, for PCT application No. PCT/US2013/053497, titled, Simulated Stapling and Energy Based Ligation for Surgical Training, dated Feb. 12, 2015.

The International Bureau of WIPO, International Preliminary Report on Patentability for international application No. PCT/US2013/061728, titled Surgical Training Model for Laparoscopic Procedures, dated Apr. 9, 2015.

The International Bureau of WIPO, International Preliminary Report on Patentability for International Application No. PCT/US2013/062363, titled Surgical Training Model for Laparoscopic Procedures, dated Apr. 9, 2015.

The International Bureau of WIPO, International Preliminary Report on Patentability for International Application No. PCT/US2013/062269, titled Surgical Training Model for Laparoscopic Procedures, dated Apr. 9, 2015.

The International Bureau of WIPO, International Preliminary Report on Patentability for International Application No. PCT/US2013/061557, titled Surgical Training Model for Laparoscopic Procedures, dated Apr. 9, 2015.

The International Bureau of WIPO, International Preliminary Report on Patentability for International Application No. PCT/US2013/061949, titled Surgical Training Model for Laparoscopic Procedures, dated Apr. 9, 2015.

European Patent Office, The International Search Report and Written Opinion for International Application No. PCT/US2015/020574, titled "Advanced First Entry Model for Surgical Simulation," dated Jun. 1, 2015.

European Patent Office, The International Search Report and Written Opinion for International Application No. PCT/US2015/022774, dated Jun. 11, 2015 entitled "Simulated Dissectible Tissue."

Lamouche, Guy, et al., "Review of tissue simulating phantoms with controllable optical, mechanical and structural properties for use in optical coherence tomography," Biomedical Optics Express, vol. 3, No. 6, Jun. 1, 2012 (18 pgs.).

Anonymous: Silicone Rubber—from Wikipedia, the free encyclopedia, Feb. 21, 2014, pp. 1-6.

The International Bureau of WIPO, International Preliminary Report on Patentability for International Application No. PCT/US2014/019840, titled Simulated Tissue Structure for Surgical Training, dated Sep. 11, 2015.

The International Bureau of WIPO, International Preliminary Report on Patentability for International Application No. PCT/US2014/038195, titled Hernia Model, dated Nov. 26, 2015.

The International Bureau of WIPO, International Preliminary Report on Patentability for International Application No. PCT/US2014/042998, titled "Gallbladder Model" dated Dec. 30, 2015.

European Patent Office, International Search Report and Written Opinion for International Application No. PCT/US2013/053497 titled "Simulated Stapling and Energy Based Ligation for Surgical Training" dated Nov. 5, 2013.

The International Bureau of WIPO, International Preliminary Report on Patentability for International Application No. PCT/US2014/048027, titled "First Entry Model" dated Feb. 4, 2016.

European Patent Office, International Search Report for International Application No. PCT/US2011/053859 A3, dated May 4, 2012, entitled "Portable Laparoscopic Trainer".

European Patent Office, The International Search Report and Written Opinion for International Application No. PCT/US2012/60997, dated Mar. 7, 2013, entitled "Simulated Tissue Structure for Surgical Training".

European Patent Office, The International Search Report and Written Opinion for International Application No. PCT/US2012/070971, dated Mar. 18, 2013, entitled "Advanced Surgical Simulation".

The International Bureau of WIPO, International Preliminary Report on Patentability for International Application No. PCT/US2011/053859, titled "Portable Laparoscopic Trainer" dated Apr. 2, 2013.

(56) References Cited

OTHER PUBLICATIONS

European Patent Office, The International Search Report and Written Opinion for International Application No. PCT/US2013/062363, dated Jan. 22, 2014, entitled "Surgical Training Model for Laparoscopic Procedures".
European Patent Office, The International Search Report and Written Opinion for International Application No. PCT/US2013/061949, dated Feb. 17, 2014, entitled "Surgical Training Model for Laparoscopic Procedures".
Anonymous: Realsim Systems—LTS2000, Sep. 4, 2005, pp. 1-2, XP055096193, Retrieved from the Internet: URL:https://web.archive.org/web/2005090403; 3030/http://www.realsimsystems.com/exersizes.htm (retrieved on Jan. 14, 2014).
European Patent Office, The International Search Report and Written Opinion for International Application No. PCT/US2013/062269, dated Feb. 17, 2014, entitled "Surgical Training Model for Transluminal Procedures".
European Patent Office, The International Search Report and Written Opinion for International Application No. PCT/US2013/061557, dated Feb. 10, 2014, entitled "Surgical Training Model for Laparoscopic Procedures".
European Patent Office, The International Search Report and Written Opinion for International Application No. PCT/US2013/061728 dated Oct. 18, 2013, entitled "Surgical Training Model for Laparoscopic Procedures".
Limps and Things, EP Guildford MATTU Hernia Trainer, http://limbsandthings.com/us/products/tep-guildford-mattu-hernia-trainer/.
Simulab, Hernia Model, http://www.simulab.com/product/surgery/open/hernia-model.
McGill Laparoscopic Inguinal Hernia Simulator, Novel Low-Cost Simulator for Laparoscopic Inguinal Hernia Repair.
European Patent Office, Invitation to Pay Additional Fees and Where Applicable, Protest Fee, for International Application No. PCT/US2014/038195, titled "Hernia Model", dated Aug. 4, 2014.
Kurashima, Y et al., A tool for training and evaluation of laparoscopic inguinal hernia repair: The Global Operative Assessment of Laparoscopic Skills—Groin Hernia, American Journal of Surgery, Paul Hoeber, New York, NY, US vol. 201, No. 1, Jan. 1, 2011, pp. 54-61.
European Patent Office, The International Search Report and Written Opinion for International Application No. PCT/US2012/070971, dated Jul. 4, 2014, entitled "Advanced Surgical Simulation Constructions and Methods".
International Bureau of WIPO, International Preliminary Report on Patentability for International Application No. PCT/US2012/070971, titled "Advanced Surgical Simulation" dated Jun. 24, 2014.
The International Bureau of WIPO, International Preliminary Report on Patentability for International Application No. PCT/US2012/060997, titled "Simulated Tissue Structure for Surgical Training" dated Apr. 22, 2014.
European Patent Office, The International Search Report and Written Opinion of the International Searching Authority for International Application No. PCT/US2016/062669 titled "Simulated Dissectible Tissue," dated Apr. 5, 2017, 19 pgs.
European Patent Office, Examination Report for European Application No. 14733949.3 titled "Gallbladder Model," dated Dec. 21, 2016, 6 pgs.
The International Bureau of WIPO, International Preliminary Report on Patentability and Written Opinion for International Application No. PCT/US2015/059668, entitled "Simulated Tissue Models and Methods," dated May 26, 2017, 16 pgs.
European Patent Office, The International Search Report and Written Opinion of the International Searching Authority for International Application No. PCT/US2017/020389 titled "Simulated Tissue Cartridge", dated May 24, 2017, 13 pgs.
The International Bureau of WIPO, International Preliminary Report on Patentability for International Application No. PCT/US2016/018697, entitled "Simulated Tissue Structures and Methods," dated Aug. 31, 2017, 14 pgs.
European Patent Office, Invitation to Pay Additional Fees for International Application No. PCT/US2016/062669, titled "Simulated Dissectible Tissue", dated Feb. 10, 2017, 8 pgs.
European Patent Office, The International Search Report and Written Opinion of the International Searching Authority for International Application No. PCT/US2016/055148 titled "Hysterectomy Model", dated Feb. 28, 2017, 12 pgs.
Society of Laparoendoscopic Surgeons, "Future Technology Session: The Edge of Innovation in Surgery, Space, and Business" http://www.laparoscopytoday.com/endourology/page/2/ , Figure 1B: http://laparoscopy.blogs.com/laparoscopy_today/images/6-1/6-1VlaovicPicB.jpg , Sep. 5-8, 2007, 10 pgs.
Miyazaki Enterprises, "Miya Model Pelvic Surgery Training Model and Video," www.miyazakienterprises, printed Jul. 1, 2016, 1 pg.
European Patent Office, International Search Report and Written Opinion for International Application No. PCT/US2015/059668 titled "Simulated Tissue Models and Methods" dated Apr. 26, 2016, 20 pgs.
Australian Patent Office, Patent Examination Report No. 1 for Australian Application No. 2012358851 titled "Advanced Surgical Simulation" dated May 26, 2016, 3 pgs.
European Patent Office, International Search Report and Written Opinion for International Application No. PCT/US2016/032292 titled "Synthetic Tissue Structures for Electrosurgical Training and Simulation," dated Jul. 14, 2016, 11 pgs.
European Patent Office, International Search Report and Written Opinion for International Application No. PCT/US2016/018697 titled "Simulated Tissue Structures and Methods," dated Jul. 14, 2016, 21 pgs.
European Patent Office, International Search Report and Written Opinion for International Application No. PCT/US2016/034591 titled "Surgical Training Model for Laparoscopic Procedures," dated Aug. 8, 2016, 18 pgs.
European Patent Office, The International Search Report and Written Opinion of the International Searching Authority for International Application No. PCT/US2016/036664 titled "Hysterectomy Model", dated Aug. 19, 2016, 15 pgs.
The International Bureau of WIPO, International Preliminary Report on Patentability for International Application No. PCT/US2015/020574, entitled "Advanced First Entry Model for Surgical Simulation," dated Sep. 22, 2016, 9 pgs.
European Patent Office, The International Search Report and Written Opinion of the International Searching Authority for International Application No. PCT/US2016/0043277 titled "Appendectomy Model", dated Oct. 4, 2016, 12 pgs.
The International Bureau of WIPO, International Preliminary Report on Patentability for International Application No. PCT/US2015/022774, titled "Simulated Dissectible Tissue," dated Oct. 6, 2016, 9 pgs.
European Patent Office, The International Search Report and Written Opinion of the International Searching Authority for International Application No. PCT/US2016/041852 titled "Simulated Dissectible Tissue", dated Oct. 13, 2016, 12 pgs.
3D-MED Corporation, "Validated Training Course for Laparoscopic Skills", https://www.3-dmed.com/sites/default/files/product-additional/product-spec/Validated%20Training%20Course%20for%20Laparosco pic%20Skills.docx_3.pdf, printed Aug. 23, 2016, pp. 1-6.
3D-MED Corporation, "Loops and Wire #1" https://www.3-dmed.com/product/loops-and-wire-1 , printed Aug. 23, 2016, 4 pgs.
Barrier, et al., "A Novel and Inexpensive Vaginal Hysterectomy Simulatory," Simulation in Healthcare: The Journal of the Society for Simulation in Healthcare, vol. 7, No. 6, Dec. 1, 2012, pp. 374-379.

* cited by examiner

GALLBLADDER MODEL

CROSS-REFERENCE TO RELATED APPLICATIONS

This application claims priority to and benefit of U.S. Provisional Patent Application Ser. No. 61/836,512 entitled "Gallbladder model" filed on Jun. 18, 2013 which is incorporated herein by reference in its entirety.

FIELD OF THE INVENTION

This application relates to surgical training tools, and in particular, to simulated tissue structures and models for teaching and practicing surgical procedures involving a gallbladder.

BACKGROUND OF THE INVENTION

A common treatment for gallstones and other gallbladder conditions is a cholecystectomy which is the surgical removal of the gallbladder from the liver bed. Laparoscopic cholecystectomy is the most common laparoscopic procedure and has replaced open cholecystectomy as the first-choice of treatment for gallstones and inflammation of the gallbladder. Laparoscopic cholecystectomy advantageously requires smaller incisions, resulting in less pain, improved cosmetic results, quicker healing, and fewer complications such as infection and adhesions.

Laparoscopic cholecystectomy requires several small incisions in the abdomen to allow the insertion of trocars or small cylindrical tubes approximately 5 to 10 millimeters in diameter through which surgical instruments and a laparoscope are placed into the abdominal cavity. The laparoscope illuminates the surgical field and sends a magnified image from inside the body to a video monitor giving the surgeon a close-up view of the organs and tissues. The surgeon watches the live video feed and performs the operation by manipulating the surgical instruments placed through the trocars.

In a laparoscopic cholecystectomy, a patient is placed in a supine position on the operating table and anesthetized. A scalpel can be used to make a small incision at the umbilicus. Using a trocar, the abdominal cavity is entered and enlarged by delivering carbon dioxide gas to insufflate the cavity to create a working space inside the patient's abdominal region. The trocar may include an inserted laparoscope for observing the penetration, insertion, and insufflation of the abdominal space. Additional trocars are inserted at a location inferior to the ribs. Using the laparoscope, the fundus of the gallbladder, which is covered by the peritoneum, is identified, grasped with a surgical grasper extending through one of the trocars, and retracted. A second surgical grasper may be used to retract the rest of the gallbladder in a lateral direction to expose Calot's triangle. Calot's triangle is that portion of the gallbladder anatomy that is bound by the cystic duct, cystic artery, the hepatic duct and the border of the liver. The surgeon identifies the cystic duct and cystic artery. In this area, the underlying structures are carefully skeletonized from the peritoneum separating the peritoneum from the both the cystic duct and the cystic artery. A surgical clip applier is introduced through one of the trocars and clips are applied in two locations to both the cystic duct and the cystic artery. The cystic duct and the cystic artery are then divided with surgical scissors between the two locations of clips freeing the gallbladder for removal. The gallbladder is dissected from the bed of the liver and removed through one of the trocars. During laparoscopic cholecystectomy, complications may arise due to gallbladder perforation which can occur due to excessive traction during retraction or during dissection of the gallbladder from the liver bed or extraction from the abdomen. The outcome of laparoscopic cholecystectomy is greatly influenced by the training, experience and skill of the surgeon performing the procedure. In order for residents and surgeons to learn and practice these surgical techniques, a realistic, functional, and anatomically correct model for use in a laparoscopic training device is needed.

A gallbladder model is not only useful for training residents and surgeons in laparoscopic cholecystectomy, but also, desirable for training residents and surgeons in laparoscopic common bile duct exploration. The common bile duct is a tube that connects the liver, gallbladder and pancreas to the small intestine and delivers fluid to aid in digestion. Common bile duct exploration is a procedure used to see if a gallbladder stone or some other obstruction is blocking the flow of bile from the gallbladder or liver to the intestine which can cause jaundice. In a laparoscopic common bile duct exploration procedure, the abdominal cavity is approached as in a cholecystectomy described above. The surgeon identifies the common bile duct and a small hemi-circumferential incision is made in the common bile duct. A cholangiography catheter is inserted into the insufflated abdominal cavity through one of the trocars and into the incision made in the common bile duct. Contrast media or radiopaque fluid is introduced into the cystic and common bile ducts and an X-ray is taken to reveal the location of any gallstones in the common bile duct. If there are gallstones, the obstructions will appear as discontinuities in the flow of contrast media. The gallstones are then surgically extracted.

In order to help patient outcomes and recoveries, surgeons need a way to practice laparoscopic cholecystectomies and common bile duct explorations outside of the operating room. The practice model needs to be anatomically correct and include all important landmarks normally seen during surgery in order to give the surgeon or resident the most realistic practice possible.

SUMMARY OF THE INVENTION

According to one aspect of the invention, an anatomical model for surgical training is provided. The model includes a first layer having an inner surface and an outer surface. The first layer has a substantially uniform thickness defined between the inner surface and the outer surface. The first layer has a first perimeter and is configured to simulate at least a portion of a first anatomical structure. The model includes a second layer having an inner surface and an outer surface. The second layer has a thickness between the inner surface and the outer surface. The second layer defines a second perimeter and overlays the first layer such that the outer surface of the second layer faces the inner surface of the first layer. The model includes at least one second simulated anatomical structure which has a third perimeter around the at least one simulated anatomical structure. The at least one simulated anatomical structure is connected to the inner surface of the second layer. The outer surface of the second layer is connected to the inner surface of the first layer at least partially around the location of the at least one second simulated anatomical structure.

According to another aspect of the invention, an anatomical model for surgical training is provided. The model includes an anatomical portion and a support removably connectable to the anatomical portion. The anatomical portion includes at least a first layer having an inner surface and an outer surface interconnected by a top side and a bottom side and a left side and a right side. The first layer has a thickness defined between the inner surface and the outer surface. The first layer is configured to simulate at least a portion of a liver. The top side of the first layer has a peak. The model includes a simulated gallbladder positioned in the location of the peak and facing the inner surface of the first layer. The model includes a frame connected to at least the first layer. The frame has a first end interconnected to a second end by a central portion. The first end and the second end of the frame are removably connectable to the support to hold the anatomical portion in a substantially upright position. The frame does not extend into the location of the peak such that the first layer in the location of the peak is capable of flexing inwardly and outwardly relative to the frame.

According to another aspect of the invention, an anatomical model for surgical training is provided. The model includes an anatomical portion having a first layer. The first layer includes an inner surface and an outer surface interconnected by a top side and a bottom side and a left side and a right side. The first layer has a thickness defined between the inner surface and the outer surface. The first layer is configured to simulate at least one anatomical structure. The anatomical portion includes a second layer that includes at least one anatomical structure overlaying the first layer. The anatomical portion also includes a frame having a first end interconnected to a second end by a central portion. At least part of the frame is embedded within the first layer with the first end and the second end of the frame extending out from the first layer. The model includes a support to which the first end and the second end of the frame are removably connectable to the support to hold the anatomical portion in a substantially upright position with respect to a supporting surface.

According to another aspect of the invention, a surgical simulation system is provided. The system includes an anatomical model. The model includes an anatomical portion. The anatomical portion includes a first layer having an inner surface and an outer surface interconnected by a top side and a bottom side and a left side and a right side. The first layer has a substantially uniform thickness defined between the inner surface and the outer surface. The first layer is configured to simulate at least one anatomical structure and defines a substantially planar configuration. The model includes a second layer having a plurality of anatomical structures connected to and overlaying the inner surface of the first layer. A support is connectable to the anatomical portion and configured to hold the anatomical portion in a substantially perpendicular orientation with respect to a supporting surface. The system further includes a surgical training device. The surgical training device includes a base and a top cover connected to and spaced apart from the base to define a simulated insufflated internal cavity between the top cover and the base. The internal cavity is at least partially obstructed from direct observation by a user. The top cover includes an aperture or penetrable simulated tissue region. The top cover of the surgical training device is angled to form an acute angle with respect to a horizontal plane as measured from inside the cavity. The anatomical model is positioned inside the internal cavity a distance opposite the acute angle such that the inner surface of the first layer faces the acute angle and the aperture or penetrable simulated tissue region.

According to another aspect of the invention, an anatomical model for surgical training is provided. The model includes an anatomical portion. The anatomical portion includes a first layer having an inner surface and an outer surface interconnected by a top side, a bottom side, a left side and a right side. The inner surface is substantially planar and flat and the first layer defines a thickness between the inner surface and the outer surface. The first layer is configured to simulate at least a portion of a liver. The top side of the first layer has a peak. The anatomical portion includes a second layer having an inner surface and an outer surface interconnected by a top side, a bottom side, a left side and a right side. The second layer overlays the first layer such that the outer surface of the second layer faces the inner surface of the first layer. The outer surface of the second layer is connected to the inner surface of the first layer along at least part of a first perimeter. The second layer defines a thickness between the inner surface and the outer surface and the thickness of the second layer is smaller than the thickness of the first layer. The anatomical portion includes a third layer having at least one simulated anatomical structure. The at least one simulated anatomical structure is connected to the inner surface of the second layer. The anatomical portion further includes a fourth layer having an inner surface and an outer surface interconnected by a top side, a bottom side, a left side and a right side. The fourth layer overlays the second layer and the third layer such that the outer surface of the fourth layer faces the inner surface of the second layer and the at least one simulated anatomical structure. The outer surface of the fourth layer is connected to the inner surface of the second layer along at least part of a second perimeter. The fourth layer defines a thickness between the inner surface and the outer surface and the thickness of the fourth layer is smaller than the thickness of the first layer. The anatomical portion further includes a frame at least partially embedded inside the first layer. The model includes a support connectable to the frame to hold the anatomical portion in a substantially upright position.

According to another aspect of the invention, a gallbladder model is provided. The model allows users to practice open and laparoscopic cholecystectomies and common bile duct explorations. The gallbladder model includes an anatomical portion connected to a support. The anatomical portion includes a liver layer, a fascia layer, a gallbladder layer, a peritoneum layer, and a frame connected together and held in an upright orientation by the support.

DETAILED DESCRIPTION OF THE INVENTION

Figure 1:
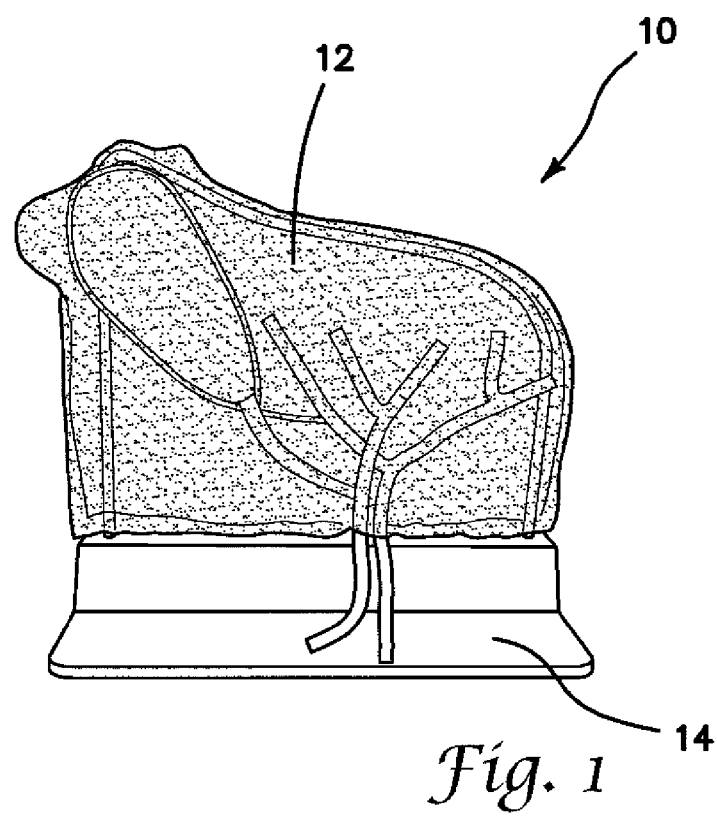
FIG. 1 is a top perspective view of an anatomical model according to the present invention.

Turning now to FIG. 1, there is shown a gallbladder model 10 according to the present invention. The gallbladder model 10 includes an anatomical portion 12 removably connected to a support 14. The substantially planar anatomical portion 12 is maintained in an upright configuration by the support 14. In a cholecystectomy, as described above in the background section of this application, the fundus of the gallbladder is visible and retracted. In doing so, the remainder of the gallbladder underlying the liver toward the posterior of the patient is uncovered and made visible along with the triangle of Calot in the insufflated cavity. This retraction involves lifting part of the lower or inferior portion of the right lobe of the liver. With the liver and gallbladder lying substantially in the X-Z plane or frontal plane of the patient, and the retraction lifting the liver and gallbladder substantially into the Y plane or transverse plane of the patient, the gallbladder model 10 of the present invention is a substantial or partial projection of at least a portion of the retracted liver and gallbladder onto the X-Y plane or transverse plane of a patient. Hence, the gallbladder model 10 represents a substantial planar projection of a retracted liver and gallbladder in a simulated insufflated cavity. As such, the gallbladder model 10 configuration advantageously provides a surgical approach to a simulated gallbladder already in a retracted perpendicular orientation when viewed by the user approaching the gallbladder from the location of the umbilicus. Also, the gallbladder model 10 configuration permits practice by the user without requiring a second user to hold portions of the model with graspers in a retracted position and as such, the model 10 is advantageously designed to be used by one person at a time. Furthermore, in the model 10, only a portion of the liver is simulated, in particular, the right lobe of the liver. Together, with the right lobe, the entirety of the biliary structure including the gallbladder is included in the model.

Figure 2:
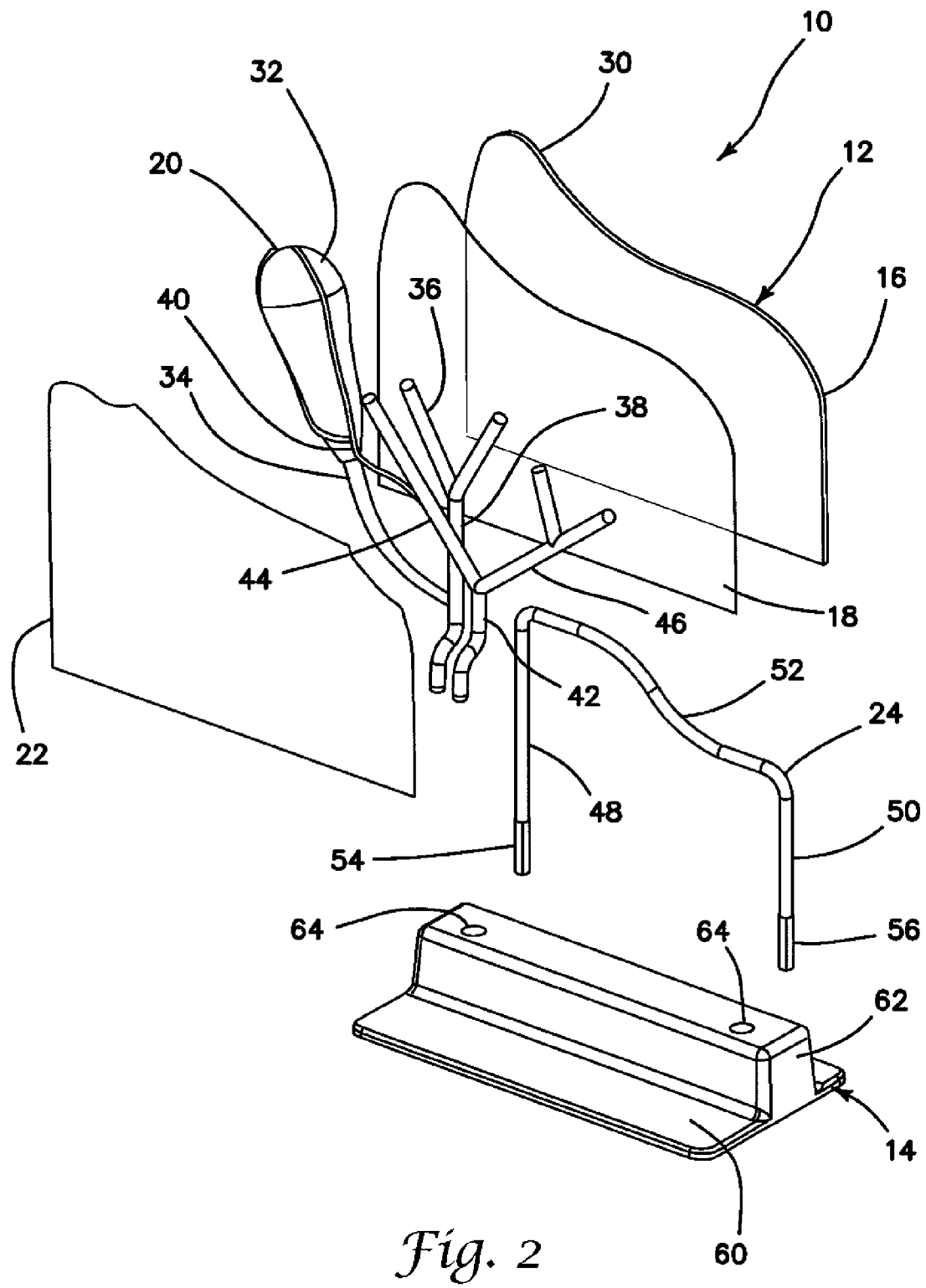
FIG. 2 is an exploded, top perspective view of an anatomical model according to the present invention.

Turning now to FIG. 2, there is shown an exploded view of the gallbladder model 10 comprising an anatomical portion 12 connected to a support 14. The anatomical portion 12 includes a liver layer 16, a fascia layer 18, a gallbladder layer 20, a peritoneum layer 22, and a frame 24 connected together. Each layer will now be described in greater detail.

Figure 3:
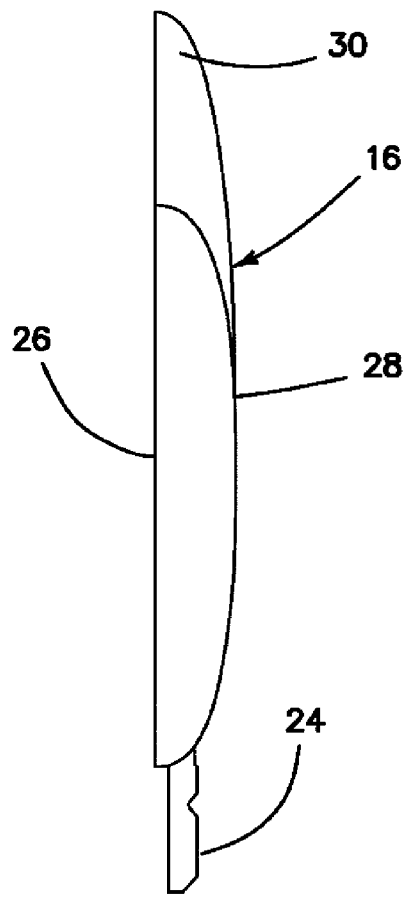
FIG. 3 is a side view of a liver layer of an anatomical portion of the anatomical model according to the present invention.

Still referencing FIG. 2, the liver layer or first layer 16 is molded from silicone or thermoplastic elastomer that is dyed with a red color and configured to simulate a retracted portion of a liver. In particular, the liver layer 16 is shaped to represent a portion of the right lobe of a human liver that is retracted to expose the gallbladder and triangle of Calot. Referring to FIG. 3, the liver layer 16 includes a flat planar inner surface 26 and a convex curved outer surface 28. The inner and outer surfaces 26 interconnect along four sides—a curved top side, a straight bottom side, and a left side and right side that interconnect the top and bottom sides. The curved top side includes a peak 30 near or at the left side of the model. The top side curves downward from the peak 30 to a lower portion that interconnects with the right side. This peaked shape resembles a substantially planar projection of a retracted right lobe of a human liver. The peak 30 has a longer length relative to other portions of the liver layer 16. The thickest portion of the liver layer 16 is approximately 0.5 inches and located approximately at the middle. In one variation, the frame 24 is molded directly into the liver layer 16 such that at least a portion of the frame 24 resides inside the liver layer 16 and a portion of the frame 24 resides outside of the liver layer 16 as shown in FIG. 3. The frame 24 will be described in greater detail below.

Still referencing FIG. 2, the fascia layer or second layer 18 is a thin approximately 0.01-0.03 inches thick layer made of a thermoplastic elastomer or silicone that is partially translucent, clear or dyed with a slight yellow color. The fascia layer 18 has the same peaked shape as the liver layer 16 and is sized and configured to overlay the liver layer 16. The fascia layer 18 has an inner surface and an outer surface with the outer surface overlaying a portion of the inner surface 26 of the liver layer 16. The fascia layer 18 is attached to the liver layer 16 with adhesive that is placed at least along the perimeter such that the majority of the middle portion or portions interior from the perimeter of the fascia layer 18 are not attached to the liver layer 16, but instead, are free to remain mobile and separate away from the liver layer 16. While this fascia layer 18 does not exist in real life, that is, there is no tissue layer located between the gallbladder and the liver, the gallbladder model 10 of the present invention includes a fascia layer 18 which advantageously simulates the dissection and removal of the gallbladder away from the liver. This advantage will be described in greater detail below.

Still referencing FIG. 2, the gallbladder layer or third layer 20 includes at least one body component. In FIG. 2, the at least one body component is a plurality of anatomical structures. For example, the gallbladder layer 20 includes a gallbladder 32 connected to a cystic duct 34, a common hepatic duct 36 connected to a common bile duct 38, a cystic artery 40, and a common hepatic artery 42 connected to and branching into the right hepatic artery 44 and left hepatic artery 46. All of these anatomical structures are configured to simulate actual human anatomy and arranged within the gallbladder layer 20 in an anatomically correct fashion. The gallbladder 32 is a hollow bulbous structure molded out of silicone or other thermoplastic material dyed with a light green or yellow color to simulate bile. In another variation, the gallbladder 32 is a solid and not hollow structure. The cystic duct 34, common hepatic duct 36 and common bile duct 38 are also made of silicone or thermoplastic material that is dyed with a light green color. The cystic duct 34 is tubular in shape having a tapered end and a diameter of approximately 0.15-0.25 inches. In one variation, the cystic duct 34 has a lumen with a minimum inner diameter of 0.15 inches and a maximum outer diameter of 0.25 inches making it small enough to clip and large enough to permit insertion of catheter. In yet another variation, the cystic duct 34 includes a lumen having an inner surface that is lubricated with lubricant. In yet another variation, the cystic duct 34 is larger in outer diameter relative to dimension of a real life cystic duct 34 to facility training and insertion of a catheter into the lumen. The common hepatic duct 36 and common bile duct 38 are also tubular in shape having a diameter of approximately 0.15 inches. In one variation, the cystic duct 34, common hepatic duct 36 and common bile duct 38 are hollow and in another variation they are solid. The cystic artery 40, the common hepatic artery 42, the right hepatic artery 44 and the left hepatic artery 46 are made from silicone or thermoplastic material that is dyed a red color and molded into a tubular shape having a diameter of approximately 0.15 inches. In one variation, the cystic artery 40, common hepatic artery 42, the right hepatic artery 44 and the left hepatic artery 46 are hollow and in another variation they are solid structures. The gallbladder layer 20 is connected to the fascia layer 18 with selectively-placed adhesive. The gallbladder layer 20 may be formed from multiple pieces joined together or as a unit with no disconnects. To form a unitary gallbladder layer 20, the manufacturing process consists of a wax form that is dipped in molten plastic and melted out once the plastic has set.

In one variation, the gallbladder model 10 is configured for practicing bile duct exploration. In such a variation, the biliary structures of the gallbladder layer 20 are hollow and filled with fluid that resembles bile. An exemplary fluid is green-colored dishwashing liquid. The inner diameter of the hollow biliary structures is approximately 0.09 inches and the outer diameter is approximately 0.15 inches. The gallbladder model 10 that is configured for biliary exploration includes a hollow gallbladder 32 filled with fluid that resembles bile. So that the simulated bile fluid is not lost, the free ends of the cystic duct 34, common hepatic duct 36, and common bile duct 38 are closed or capped with standard tubing caps, solid connectors or barbed connectors that retain fluid inside the ducts. If not molded as a single unit, biliary structures made of multiple tubular structures are connected together with connectors. For example, the junction between the common hepatic duct 36 and common bile duct 38 is connected with a connector such as a Y-shaped split that permits fluid to flow therebetween. In one variation, the cystic duct 34 and the common bile duct 38 are connected via a connector or molded as a unitary structure such that fluid is allowed to flow between the cystic duct 34 and the common bile duct 38. The employ of connectors is advantageous in that after practice scenarios in which the ducts are cut, such as in a cholecystectomy, the severed ducts are replaceable with new ducts that are reconnected at the same locations using the same connectors so that training scenarios can be repeated. In the gallbladder model 10 that is adapted for biliary duct exploration, any one or more of the gallbladder 32, bile duct 34, common hepatic duct 36, and common bile duct 38, may include one or more simulated gallstones (not shown). A simulated gallstone is a small bead-like structure made of plastic or other material. The simulated gallstones are placed inside the hollow space of the gallbladder 32 and/or inside the lumen of one or more of the cystic duct 34, common hepatic duct 36, and common bile duct 38. These simulated gallstones are shaped and configured such that they are not visible to the user when the model is received but become visible when a syringe and/or catheter is used to inject simulated contrast media fluid such as colored water into one or more of the ducts and the continuous flow of contrast media fluid is visibly interrupted or blocked by the gallstones as the simulated contrast media fluid fills the biliary structures. In another variation, a kit is provided that includes a syringe with which the gallbladder 32 is injected with fluid and/or simulated gallstones. In another variation, the gallbladder 32 is not filled with liquid but is filled with air which may be injectable into the open cavity of the gallbladder 32 with a syringe or other similar device. The cavity of the gallbladder 32 may be pressurized to a pressure greater than ambient such that when the gallbladder 32 is inadvertently punctured, as if by an improper surgical technique, the gallbladder 32 noticeably deflates and as such provides a visual indication to the trainee. In such a variation, the gallbladder 32 has a wall thickness configured to permit observation of deflation of the gallbladder 32.

Still referencing FIG. 2, the peritoneum layer or fourth layer 22 is a thin layer approximately 0.01-0.03 inches thick made of a thermoplastic elastomer or silicone that is clear or partially translucent and/or dyed with a slightly yellow color. The peritoneum layer 22 is nearly identical to the fascia layer 18 and has the same peaked shape as the underlying fascia layer 18 and liver layer 16. The peritoneum layer 22 includes an inner surface and an outer surface overlaying the gallbladder layer 20 and overlaying at least a portion of the inner surface of the second layer 18. In one variation, both the fascia layer 18 and the peritoneum layer 22 are each formed by molding liquid silicone on a layer of foam such as packaging foam or other spongiform structure and then peeled off the foam after it has set to impart at least one textured surface to the fascia and peritoneum layers 18, 22. The peritoneum layer 22 is sized and configured to overlay the gallbladder layer 20. The peritoneum layer 22 is attached to the fascia layer 18 with adhesive that is placed in locations that are capable of direct contact with the fascia layer 18 without interference from the intervening gallbladder layer 20. Hence, only portions of the peritoneum layer 22 are adhered to the fascia layer 18 and in one variation, the peritoneum layer 22 is only adhered to the fascia layer 18 and not to the gallbladder layer 20. In another variation, portions of the peritoneum layer 22 are adhered to portions of the gallbladder layer 20 as well as the fascia layer 18. In yet in another variation, portions of the peritoneum layer 22 are adhered only to portions of the gallbladder layer 20. The layers are adhered with adhesive or by the inherent tackiness of the material composing the layers. In essence, the peritoneum layer 22 is selectively adhered to one or more of the underlying gallbladder layer 20 and fascia layer 18 with adhesive.

Figure 4:
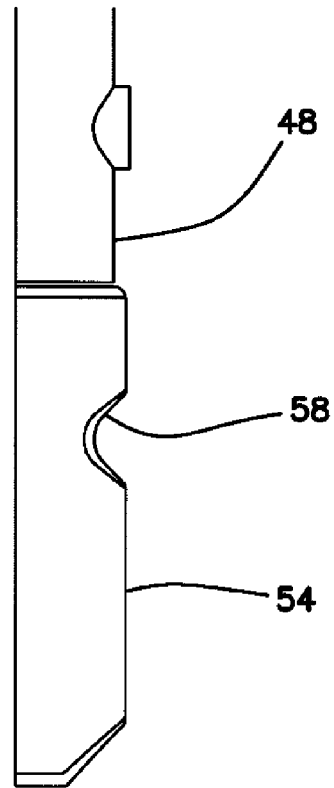
FIG. 4 is a partial side view of a prong of a frame of an anatomical portion of the anatomical model according to the present invention.

Still referencing FIG. 2, the anatomical portion 12 includes a frame 24 that is configured to support the entire anatomical portion 12 in a substantially upright orientation with respect to a table top or other substantially flat surface including an organ-receiving tray or other surface inside a laparoscopic training simulator. The frame 24 includes a left leg 48 and a right leg 50 interconnected by a central portion 52. The central portion 52 is curved and mimics the generally peaked-shape of the other layers 16, 18, 22. The frame 24 is sized smaller than the liver, fascia and peritoneum layers 16, 18, 22. The frame 24 is made of rigid metal, plastic or other polymer or material that is capable and strong enough to support the layers of silicone and plastic comprising the anatomical portion 12 of the model 10 in an upright orientation. The left leg 49 is at or adjacent to the peak and is approximately 3.5-4.0 inches long and the shorter right leg 50 is approximately 2.5-3.0 inches long. The curved central portion 52 is approximately 4.0-4.5 inches long and follows the curvature of the layers 16, 18, 22. The overall height of the gallbladder model 10 is approximately 5-6 inches and the length of the model 10 is approximately 5-6 inches. The left leg 48 defines a left prong 54 at its free end and the right leg 50 defines a right prong 56 at the free end of the right leg 50. The left and right prongs 54, 56 extend beyond the anatomical portion 12 for insertion into a support 14. The cross-section of the frame 24 is substantially circular with a diameter of approximately 0.15 inches with the prongs 54, 56 having a slightly larger diameter. Each prong 54, 56 includes a curved, ball-shaped, or spherical-shaped or angled detent 58 as illustrated in FIG. 4 which shows a sectional view of a the left leg 48. The prongs 54, 56 have angled distal tips. The frame 24 is connected to the anatomical portion 12 such that the prongs 54, 56 protrude out from the layers for connection with the support 14. As described above, in one variation, the frame 24 is molded directly into the liver layer 16 and is clear or transparent in color or substantially the same color as the liver layer 16 in which it is embedded so that it is not readily visible to the user.

Figure 7:
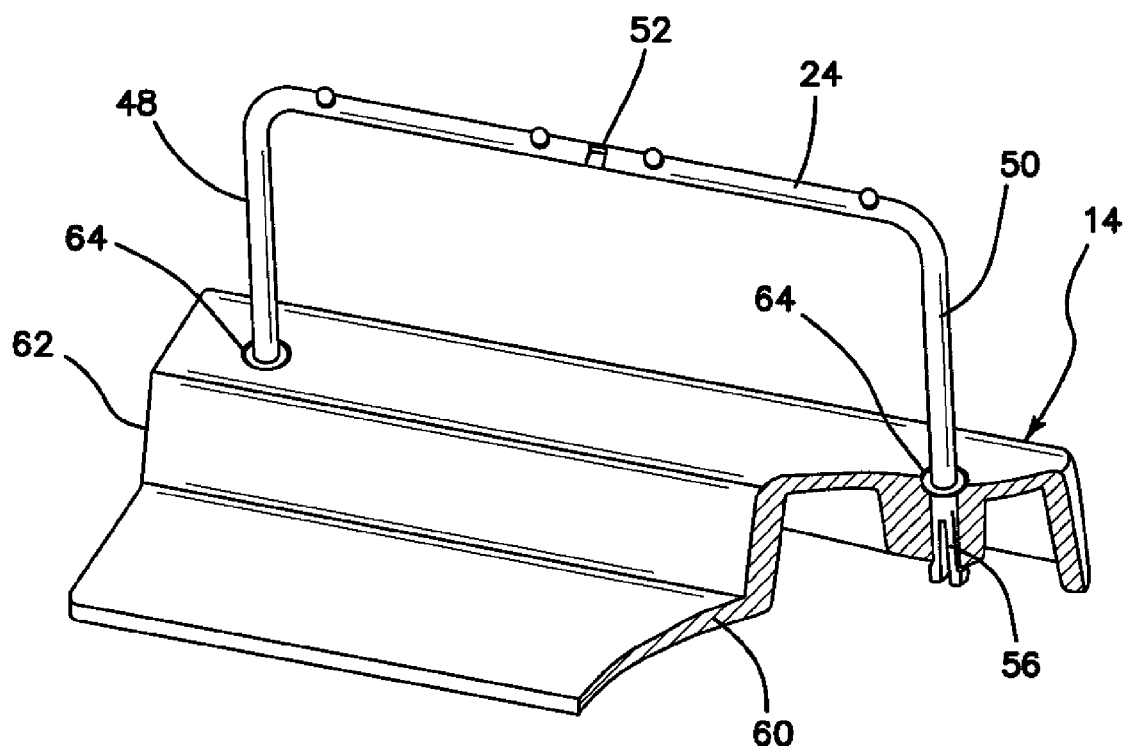
FIG. 7 is a top perspective view of a frame and support of an anatomical model according to the present invention.

In another variation, the frame 24 does not have a peaked portion and is substantially U-shaped. As shown in FIG. 7, the central portion 52 of the frame 24 is straight and does not follow the peaked-shaped of the other layers 16, 18, 22. This variation provides less support to the other layers 16, 18, 22 in the location of the peak 30 advantageously permitting all of these layers to be more flexible and to be more easily pushed distally or proximally relative to areas adjacent to the frame 24 to practice the retraction of the liver 16 from the gallbladder 32 while still providing support to the overall model 10 in the support 14. In this variation, both the right leg 50 and left leg 48 are the same length approximately 2.5-3.0 inches long instead of the left leg 48 in the location of the peak 30 being longer. The peak 30 formation in the layers 16, 18, 22 represents only a portion of the liver, in particular, the right lobe of the liver with all of the anatomical structures of the gallbladder layer 20 being presented in the model 10.

Figure 5:
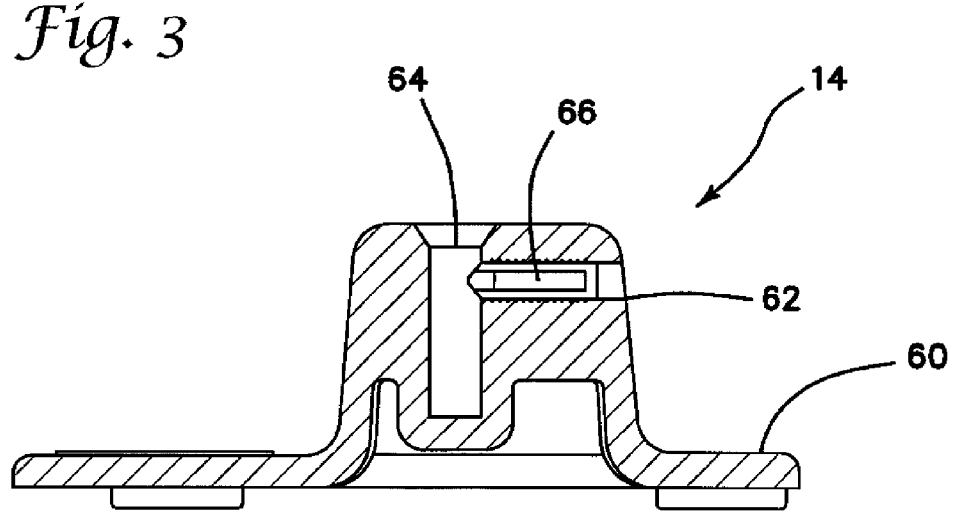
FIG. 5 is a side, cross-sectional view of a support for an anatomical portion of an anatomical model according to the present invention.

With additional reference to FIG. 5, the support 14 is configured to connect with the anatomical portion 12 and hold the anatomical portion 12 in a substantially upright orientation with respect to a table top or other surface. The support 14 includes a base 60 interconnected with an upright portion 62. The upright portion 62 includes at least two sockets 64 that are sized and configured to receive the prongs 54, 56 of the frame 24. The upright portion 62 further includes a spring-biased plunger 66 in communication with each socket 64. To connect the anatomical portion 12 to the support 14, the prongs 54, 56 are inserted into the sockets 64 of the support 14. The angled distal tips of the prongs 54, 56 cam against the plungers 66 until they snap into the detents 58 on each prong 54, 56 to securely lock the anatomical portion 12 to the support 14. The anatomical portion 12 may be removed from the support 14 by releasing the plungers 66 from each detent 58 or by pulling with force such that the detent 58 cams against the plunger 66 moving it out of the way. The anatomical portion 12 can be snapped into the support 14 or into sockets formed as a removable part of a larger anatomical model, organ tray or laparoscopic trainer. Any type of connection fit is within the scope of the present invention for connecting the anatomical portion 12 to the support 14 including left and right prongs 54, 56 that are split and splay outwardly as shown in FIG. 7. The prongs 54, 56 are further biased outwardly and ramped to flex past and snap behind a detent to secure the anatomical portion 12 to the support 14. To remove the anatomical portion 12, the slit end of the prongs 54, 56 are squeezed together by a user from underneath the support 14 to permit the prongs 54, 56 to slide past the detent. The frame 24 and the anatomical portion 12 are separated from the support 14.

The gallbladder model 10 can be used to practice open procedures that involve gallbladder anatomy. Also, the gallbladder model 10 is particularly well suited for practicing laparoscopic gallbladder procedures. To practice laparoscopic gallbladder procedures, the model 10 is placed inside a laparoscopic trainer 68 such as the trainer 68 shown in FIG. 6 and described in co-pending U.S. patent application Ser. No. 13/248,449 entitled "Portable laparoscopic trainer" and filed on Sep. 29, 2011 by Pravong et al. to Applied Medical Resources Corporation and published as U.S. Patent Application Publication No. 2012/0082970, hereby incorporated by reference in its entirety herein.

Figure 6:
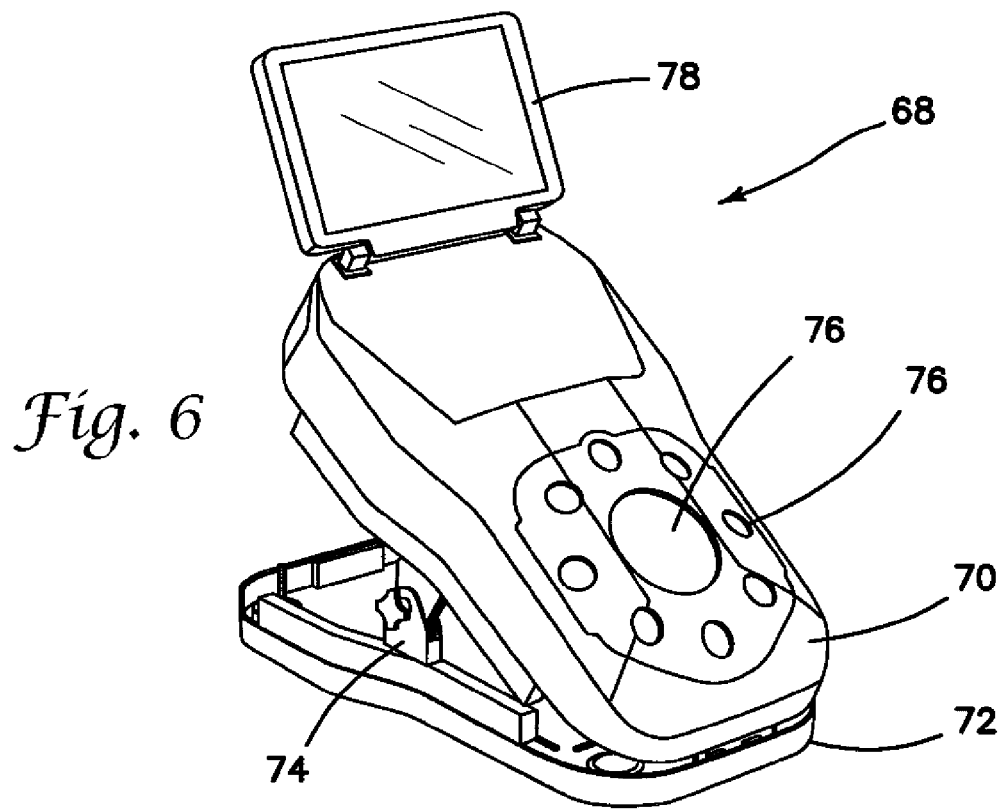
FIG. 6 is a top perspective view of a laparoscopic trainer for use with an anatomical model according to the present invention.

Still referencing FIG. 6, the laparoscopic trainer 68 includes a top cover 70 connected to a base 72 by a pair of legs 74 spacing the top cover 70 from the base 72. The laparoscopic trainer 68 is configured to mimic the torso of a patient such as the abdominal region. The top cover 70 is representative of the anterior surface of the patient and the space between the top cover 70 and the base 72 is representative of an interior of the patient or body cavity where organs reside. The laparoscopic trainer 68 is a useful tool for teaching, practicing and demonstrating various surgical procedures and their related instruments in simulation of a patient. Surgical instruments are inserted into the cavity through pre-established apertures 76 in the top cover 48. These pre-established apertures 76 may include seals that simulate trocars or may include simulated tissue region(s) that simulates the patient's skin and abdominal wall portions. Various tools and techniques may be used to penetrate the top cover 70 to perform mock procedures on model organs placed between the top cover 70 and the base 72 such as the gallbladder model 10. When placed inside the cavity of the trainer 68, the gallbladder model 10 is generally obscured from the perspective of the user who can then practice performing surgical techniques laparoscopically by viewing the surgical site indirectly via a video feed displayed on a video monitor 78. The video display monitor 78 is hinged to the top cover 70 and is shown in an open orientation in FIG. 6. The video monitor 78 is connectable to a variety of visual systems for delivering an image to the monitor 78. For example, a laparoscope inserted through one of the pre-established apertures 76 or a webcam located in the cavity and used to observe the simulated procedure can be connected to the video monitor 78 and/or a mobile computing device to provide an image to the user.

When assembled, the top cover 70 is positioned above the base 72 with the legs 74 located substantially at the periphery and interconnected between the top cover 70 and base 72. The top cover 70 and base 72 are substantially the same shape and size and have substantially the same peripheral outline. The laparoscopic trainer 68 includes a top cover 48 that angulates with respect to the base 50. The legs 52 are configured to permit the angle of the top cover 70 with respect to the base 72 to be adjusted. FIG. 6 illustrates the trainer 68 adjusted to an angulation of approximately 30-45 degrees with respect to the base 72. The selected angulation of the top cover 70 is locked by tightening thumbscrews provided on the legs 74. The angulation of the top cover 70 of the trainer 68 with respect to the base 72 is particularly advantageous with respect to accommodating the gallbladder model 10 of the present invention.

With the top cover 70 angled as shown in FIG. 6, the gallbladder model 10 is inserted into the cavity of the trainer 68 and positioned between the top cover 70 and base 72. With the gallbladder model 10 inserted into the trainer 68, the peritoneum layer 20 faces the front of the trainer 68. In particular, the inner surface of the gallbladder model 10 substantially faces the apertures or tissue simulation region 76. The model 10 shares a vertical component with the top cover 70 in the angled orientation. The top cover 70 is angled such that the top cover 70 is positioned between the user and the gallbladder model 10. The direction of approach by the user is through the apertures, or simulated tissue region(s) 76 in the top cover 70. Instruments are inserted through locations 76 in the top cover 70 to access the gallbladder model 10 for practicing surgical procedures. Also, a scope is inserted into the trainer cavity between the top cover 70 and base 72 via one of the apertures 76 to capture video images of the obscured gallbladder model 10 and display them to the user via the video monitor 78.

Users practicing laparoscopic cholecystectomy will pass other instruments in addition to the scope into the cavity of the laparoscopic trainer 68 to access the gallbladder model 10 inside the trainer 68. Because the model 10 advantageously portrays a retracted gallbladder, the user is not required to use surgical graspers to retract the simulated liver, nor is it required to have an assistant hold one or more of the graspers to maintain the retracted position. Instead, the gallbladder model 10 is designed to be used by one person.

In the practice of laparoscopic cholecystectomy, the user will practice identifying the triangle of Calot by using an inserted scope to view an image on the monitor 78. After the triangle of Calot is identified, the peritoneum layer 22 is dissected and the cystic duct 34 and cystic artery 40 are approached. Advantageously, because only select portions of the peritoneum layer 22 are adhered to the underlying layer 18 or layers 18 and 20, the cystic duct 34 and cystic artery 40 are easily skeletonized or separated from the peritoneum layer 22. Also, because portions of the cystic duct 34 and cystic artery 40 and other elements of the gallbladder layer 20 are selectively attached to the underlying layer, they advantageously maintain their anatomical layout and are still relatively mobile as they would be in vivo. The mobility of the elements comprising the gallbladder layer 20 relative to the liver layer 16 or one or more adjacent fascia or peritoneum layers 18, 22 is advantageously enhanced not only by the mere existence of such layers 18, 22 in the model 10 and the select adhesion of said gallbladder layer elements to one or more of the fascia layer 18 and peritoneum layer 22, but also, by mobility of the underlying fascia layer 18 which itself is selectively adhered to the underlying liver layer 16. Selective adherence of one layer to an adjacent layer typically results from the application of adhesive in pre-selected areas and the avoidance of adhesive in strategic areas of the anatomy that demand greater mobility and/or removal relative to the adjacent layer(s). With regards to the gallbladder 32, the gallbladder 32 is attached to the fascia layer 18 that is located above the liver layer 16. This allows the gallbladder 32 to be removed from the model 10 without damaging the liver layer 16 or only slightly damaging the liver layer 16 either of which is a more realistic outcome to the procedure. The liver is a vascular and sensitive structure and removing the gallbladder without taking too much of the liver is key to the success of a cholecystectomy and the model 10 advantageously allows realization of such outcomes in practice. While the fascia layer 18 does not exist in reality, it aids in the simulation because without the fascia layer 18, adhesive cannot be dissected in the same manner as the real-life connective tissue between the gallbladder and liver. In one variation, the outer surface of the peritoneum layer 22 is adhered to the gallbladder layer 20 with adhesive. In the same variation, the peritoneum layer 22 is also adhered to the inner surface of the second layer 18 with adhesive only along at least part of the perimeter. Also, in the same variation, the outer surface of the second layer 18 is adhered to the inner surface of the liver layer 16 with adhesive only along at least part of the perimeter. As a result of this configuration, pulling of the peritoneum layer 22 will result in the pulling of the gallbladder layer 20 along with the peritoneum layer 22 and a resulting tenting of the combined peritoneum layer 22 and gallbladder layer 20 relative to the second layer 18 and the liver layer 16 because the peritoneum layer 22 is attached to the second layer 18 only at the perimeter and the second layer 18 is in turn attached to the liver layer 16 only along at least part of the perimeter allowing for advantageous tenting effect. In a version of this variation, the gallbladder 32 is adhered to the inner surface of the second layer 32. Therefore, pulling of the gallbladder layer 20 and/or the peritoneum layer 22 and/or gallbladder 32 in a direction substantially perpendicular to the layers 16, 18, 20, 22 or away from the liver layer 16 will result in a further tenting of the second layer 18 relative to the liver layer 16 at the location of the gallbladder 32. Because the layers 18, 22 are stretchy and selectively adhered as described, tenting of the layers 18, 20, 22 will readily occur. Hence, when the peritoneum layer 22 is pulled in a direction away from the liver layer 16 a first gap or pocket is formed between the peritoneum layer 22 and the fascia layer 18 by the tenting of the peritoneum layer 22 as a result of the predetermined and selective adherence. Also, a second gap or pocket is formed between the fascia layer 18 and the liver layer 16 as the fascia layer 18 tents with respect to the liver layer 18 as the fascia layer 18 is pulled due to the predetermined and selective adherence of the gallbladder 32 to the second layer 18. Wherein the second gap or pocket is smaller than the first gap or pocket when the peritoneum layer 22 is pulled away from the liver layer 16. Also, the second layer 18 can be made slightly thicker than the peritoneum layer 22. The peritoneum layer 22 and the second layer 18 are thicker than the liver layer 16.

Prior to removal of the gallbladder 32, the user will practice introducing a surgical clip applier through one of the apertures 76 of the trainer 68 and applying clips in two locations to both the cystic duct 34 and the cystic artery 40. The vasculature and biliary structures are made of materials that allow the simulated tissue structures to function similarly to human anatomy and be pliable, dissectable, and withstand the application of real clips from a surgical clip applier such that when the clips are closed on the structures of the gallbladder layer 20, they do not sever the structures. The user then inserts laparoscopic scissors through one of the apertures 76 and cuts the cystic duct 34 and the cystic artery 40 between the two locations of clips. The gallbladder 32 is then dissected from the bed of the liver and removed through one of the trocars inserted in one of the apertures 76. The gallbladder 32 is advantageously attached to the fascia layer 18 and not directly to the liver layer 16. The presence of a fascia layer 18 makes removal of the gallbladder 32 more realistic as described above providing a situs for incision.

The gallbladder model 10 is also useful for training residents and surgeons in laparoscopic common bile duct exploration. Common bile duct exploration is a procedure used to see if a gallbladder stone or some other obstruction is blocking the flow of bile from the gallbladder or liver to the intestine which can cause jaundice. In the practice of this procedure, the gallbladder model 10 is placed in the cavity of the laparoscopic trainer 68 and the abdominal cavity is approached as in a cholecystectomy described above with a scope inserted through one of the apertures 76 in the laparoscopic trainer 68 and the resulting live image displayed on the video monitor 78. The user identifies the common bile duct 38 on the monitor 78. A bladed instrument is introduced into the cavity of the trainer 68 and a small hemicircumferential incision is made in the common bile duct 38. A cholangiography catheter (not shown) such as the AEROSTAT® cholangiography catheter manufactured by Applied Medical Resources Corporation in California is inserted into the laparoscopic trainer 68 cavity through one of the apertures 76 and into the incision made in the common bile duct 38. Instead of contrast media or radiopaque fluid, colored water is injected with a syringe into the proximal end of the catheter and allowed to flow into the cystic and common bile ducts 34, 38. The colored water will fill the one or more biliary structures allowing the simulated gallstones to be seen. Hence, in training for biliary duct exploration, no fluoroscopy is required to identify the presence of gallstones in the training procedure employing the gallbladder model 10 of the present invention. If there are gallstones, the obstructions will appear as discontinuities in the flow of colored water. The user can then practice locating the simulated gallstones at the location of fluid flow obstruction or color discontinuity. Once the simulated gallstones are located the user practices removing the gallstones from the hollow biliary structures.

The present invention further includes a kit for practicing common bile duct exploration. A kit for common bile duct exploration comprises a gallbladder model 10 and a syringe of colored water. The kit further comprises a catheter and/or a plurality of simulated gallstones which can be inserted into the biliary structures of the gallbladder layer 20. The kit may further include replacement sections of any one or more ducts 34, 36, 38 and arteries 40, 42, 44, 46 and/or connectors. The replacement ducts have hollow lumens for practicing common bile duct exploration. Other replacement ducts and/or arteries in the kit are solid diameter structures for replacing ducts and/or arteries that have been previously severed in practice of previous procedures.

The gallbladder model 10 of the present invention is particularly suited for laparoscopic procedures; however, the invention is not so limited and the gallbladder model of the present invention can be used in open surgical procedures equally effectively.

It is understood that various modifications may be made to the embodiments of the gallbladder model 10 disclosed herein. Therefore, the above description should not be construed as limiting, but merely as exemplifications of preferred embodiments. Those skilled in the art will envision other modifications within the scope and spirit of the present disclosure.

We claim:

1. An anatomical model for surgical training, comprising:
    a first layer having an inner surface and an outer surface; the first layer having a thickness defined between the inner surface and the outer surface; the first layer being configured to simulate at least a portion of a first anatomical structure and having a first perimeter;
    a second layer having an inner surface and an outer surface; the second layer defining a thickness between the inner surface and the outer surface; the second layer having a second perimeter; the second layer overlaying the first layer such that the outer surface of the second layer faces the inner surface of the first layer; and
    at least one second simulated anatomical structure; the at least one second simulated anatomical structure defining a third perimeter around the at least one second simulated anatomical structure; the at least one second simulated anatomical structure being connected to the inner surface of the second layer; and
    wherein the outer surface of the second layer is connected to the inner surface of the first layer at least partially around the location of the at least one second simulated anatomical structure; and
    wherein the second layer is connected to the first layer outside the third perimeter such that the second layer is permitted to tent with respect to the first layer when the second layer is pulled away from the first layer at a location inside the third perimeter.

2. The anatomical model of claim 1 wherein the first layer simulates at least a portion of a liver and the at least one second simulated anatomical structure includes a simulated gallbladder.

3. The anatomical model of claim 1 wherein the first layer is thicker than the second layer.

4. The anatomical model of claim 1 wherein the inner surface of the first layer is flat.

5. The anatomical model of claim 1 wherein the second layer is not connected to the first layer at a location inside the third perimeter as projected onto the overlayed second layer.

6. The anatomical model of claim 1 wherein the outer surface of the second layer is connected to the inner surface of the first layer at a location along at least part of the third perimeter or outside the third perimeter as projected onto the first layer.

7. An anatomical model for surgical training, comprising:
    a first layer having an inner surface and an outer surface; the first layer having a thickness defined between the inner surface and the outer surface; the first layer being configured to simulate at least a portion of a first anatomical structure and having a first perimeter;
    a second layer having an inner surface and an outer surface; the second layer defining a thickness between the inner surface and the outer surface; the second layer having a second perimeter; the second layer overlaying the first layer such that the outer surface of the second layer faces the inner surface of the first layer; and
    at least one second simulated anatomical structure; the at least one second simulated anatomical structure defining a third perimeter around the at least one second simulated anatomical structure; the at least one second simulated anatomical structure being connected to the inner surface of the second layer; and
    wherein the outer surface of the second layer is connected to the inner surface of the first layer at least partially around the location of the at least one second simulated anatomical structure; and
    further including a third layer having an inner surface and an outer surface; the third layer defining a thickness between the inner surface and the outer surface and having a fourth perimeter; the third layer overlays the second layer and the at least one second simulated anatomical structure such that the outer surface of the third layer faces the inner surface of the second layer and the at least one second simulated anatomical structure; wherein the outer surface of the third layer is connected to the inner surface of the second layer.

8. The anatomical model of claim 7 wherein the second layer is connected to the first layer outside the third perimeter such that the second layer is permitted to tent with respect to the first layer when the second layer is pulled away from the first layer at a location inside the third perimeter.

9. The anatomical model of claim 7 wherein the outer surface of the second layer is connected to the inner surface of the first layer at a location outside the third perimeter as projected onto the first layer; and
    wherein the outer surface of the third layer is connected to the inner surface of the second layer at a location outside the third perimeter as projected onto the second layer.

10. The anatomical model of claim 7 wherein the outer surface of the second layer is connected to the inner surface of the first layer at a location along at least part of the third perimeter as projected onto the first layer; and wherein the outer surface of the third layer is connected to the inner surface of the second layer at a location along at least part of the third perimeter or outside the third perimeter as projected onto the second layer.

11. The anatomical model of claim 7 wherein the thickness of the second layer and the third layer are smaller than the thickness of the first layer.

12. The anatomical model of claim 7 wherein the outer surface of the second layer is connected to the inner surface of the first layer along at least a part of the first perimeter and the outer surface of the third layer is connected to the inner surface of the second layer along at least a part of the first perimeter or second perimeter.

13. The anatomical model of claim 7 wherein the third layer is connected to the second layer at or inside the third perimeter.

14. An anatomical model for surgical training, comprising:
   a first layer having an inner surface and an outer surface; the first layer having a thickness defined between the inner surface and the outer surface; the first layer being configured to simulate at least a portion of a first anatomical structure and having a first perimeter;
   a second layer having an inner surface and an outer surface; the second layer defining a thickness between the inner surface and the outer surface; the second layer having a second perimeter; the second layer overlaying the first layer such that the outer surface of the second layer faces the inner surface of the first layer; and
   at least one second simulated anatomical structure; the at least one second simulated anatomical structure defining a third perimeter around the at least one second simulated anatomical structure; the at least one second simulated anatomical structure being connected to the inner surface of the second layer; and
   wherein the outer surface of the second layer is connected to the inner surface of the first layer at least partially around the location of the at least one second simulated anatomical structure;
   wherein the outer surface of the second layer is connected to the inner surface of the first layer along at least a part of the first perimeter such that a majority of a middle portion or portions interior from the second perimeter is not attached to the first layer and remains mobile to separate away from the first layer and wherein the first perimeter and the second perimeter are edges of the first layer and second layer, respectively.

15. An anatomical model for surgical training, comprising:
   an anatomical portion comprising:
   a first layer having an inner surface and an outer surface interconnected by a top side, a bottom side, a left side and a right side; the inner surface being substantially planar; the first layer having a thickness defined between the inner surface and the outer surface; the first layer being configured to simulate at least a portion of a liver;
   a second layer having an inner surface and an outer surface interconnected by a top side, a bottom side, a left side and a right side; the second layer overlays the first layer such that the outer surface of the second layer faces the inner surface of the first layer; the outer surface of the second layer being connected to the inner surface of the first layer along at least part of a first perimeter; the second layer defining a thickness between the inner surface and the outer surface; wherein the thickness of the second layer is smaller than the thickness of the first layer;
   a third layer including at least one simulated anatomical structure; the at least one simulated anatomical structure being connected to the inner surface of the second layer; and
   a fourth layer having an inner surface and an outer surface interconnected by a top side, a bottom side, a left side and a right side; the fourth layer overlaying the second layer and the third layer such that the outer surface of the fourth layer faces and contacts the inner surface of the second layer and faces and contacts the at least one simulated anatomical structure; the outer surface of the fourth layer being connected to the inner surface of the second layer along at least part of a second perimeter; the fourth layer defining a thickness between the inner surface and the outer surface; wherein the thickness of the fourth layer is smaller than the thickness of the first layer.

16. The anatomical model of claim 15 wherein the first perimeter is defined around the at least one simulated anatomical structure of the third layer.

17. The anatomical model of claim 15 wherein the first perimeter is defined around the edge of the first layer.

18. The anatomical model of claim 15 wherein the second layer is connected to the first layer with adhesive.

19. The anatomical model of claim 15 wherein the at least one anatomical structure is connected to the inner surface of the second layer with adhesive.

20. The anatomical model of claim 15 further including a peak projecting from the top side of the first layer.

21. The anatomical model of claim 20 wherein the top side of the second layer includes a peak that substantially matches the shape of the peak of the first layer such that the peak in the second layer conformingly overlays the peak in the first layer.

22. The anatomical model of claim 20 wherein the fourth layer includes a peak that conforms to the peak in the first layer and substantially overlays the peak in the first layer.

23. The anatomical model of claim 15 further including a frame at least partially embedded inside the first layer; and a support connectable to the frame to hold the anatomical portion in a substantially upright position.

24. The anatomical model of claim 23 wherein the frame includes a left leg and a right leg interconnected by a central portion wherein the frame does not extend into the peak of the first layer leaving it capable of flexing inwardly and outwardly.

25. The anatomical model of claim 23 wherein the frame is substantially U-shaped and extends along the top side but not inside the peak of the first layer; the frame having a right leg and a left leg interconnected by a central portion; wherein the distal portions of the right leg and left leg protrude outwardly from the first layer.

* * * * *